US007654251B2

(12) United States Patent
Jones et al.

(10) Patent No.: US 7,654,251 B2
(45) Date of Patent: Feb. 2, 2010

(54) CENTRIFUGAL COMPRESSOR WITH IMPROVED LUBRICATION SYSTEM FOR GEAR-TYPE TRANSMISSION

(75) Inventors: Daniel W. Jones, Lenexa, KS (US); Glennon J. Roderique, Overland Park, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 21 days.

(21) Appl. No.: 11/944,159

(22) Filed: Nov. 21, 2007

(65) Prior Publication Data

US 2008/0066722 A1 Mar. 20, 2008

Related U.S. Application Data

(63) Continuation of application No. 10/641,619, filed on Aug. 14, 2003, now Pat. No. 7,299,792, which is a continuation-in-part of application No. 10/248,358, filed on Jan. 13, 2003, now abandoned, which is a continuation of application No. 10/064,640, filed on Aug. 1, 2002, now Pat. No. 6,516,789, which is a continuation of application No. 10/064,418, filed on Jul. 11, 2002, now abandoned, which is a continuation of application No. 09/668,223, filed on Sep. 22, 2000, now Pat. No. 6,439,208.

(51) Int. Cl.

| | |
|---|---|
| ***F02B 33/00*** | (2006.01) |
| ***F16H 57/04*** | (2006.01) |
| ***F01M 1/00*** | (2006.01) |
| ***F01M 9/06*** | (2006.01) |
| ***F01D 1/02*** | (2006.01) |
| ***F04D 29/44*** | (2006.01) |
| ***F01D 15/12*** | (2006.01) |
| ***F04D 25/02*** | (2006.01) |

(52) U.S. Cl. .................. 123/559.1; 184/6.12; 184/11.1; 184/13.1; 415/199.1; 415/124.2; 415/122.1

(58) Field of Classification Search .............. 123/559.1; 184/6.12, 11.1, 13.1; 415/199.1, 124.2, 122.1
See application file for complete search history.

(56) References Cited

U.S. PATENT DOCUMENTS 1,903,210 A 3/1933 Carrier .................... 415/122.1

(Continued)

FOREIGN PATENT DOCUMENTS

| | | |
|---|---|---|
| DE | 3540842 A1 | 5/1987 |
| FR | 640762 | 7/1928 |
| JP | 04183933 A | 6/1992 |
| KR | 388125 B | 6/2003 |

OTHER PUBLICATIONS

Accessible Technologies, Inc. Owner's Manual entitled "1986-1993 Ford Mustang (CARB EO #D-365) ProCharger Blown +Intercooled Centrifugal Supercharger Systems" (1997).

(Continued)

*Primary Examiner*—Thai Ba Trieu
(74) *Attorney, Agent, or Firm*—Hovey Williams LLP

(57) ABSTRACT

A centrifugal supercharger includes a case presenting a compressor chamber and a transmission chamber. An impeller in the compressor chamber is mounted to a shaft that extends into the transmission chamber. The impeller shaft is drivingly connected to a power input shaft by intermeshing gears provided on the shafts. A portion of the transmission chamber defines a fluid reservoir in which lubrication fluid is held. The intermeshing gears, as well as the bearing assemblies supporting the shafts, are located outside the fluid reservoir portion of the transmission chamber. A rotatable fluid-propelling element partly submerged in the lubrication fluid contained within the reservoir portion ensures that sufficient but not excessive lubrication fluid is supplied to the intermeshing gears and the bearing assemblies. A dedicated lubricant reserve system ensures that the required operating level of fluid is provided to, and maintained in, the reservoir portion.

21 Claims, 9 Drawing Sheets

U.S. PATENT DOCUMENTS

| | | | | | |
|---|---|---|---|---|---|
| 1,974,974 | A | | 9/1934 | Puffer | 184/13.1 |
| 2,173,339 | A | * | 9/1939 | Myers | 74/421 A |
| 2,223,715 | A | | 12/1940 | Berger | 60/337 |
| 2,287,716 | A | * | 6/1942 | Whitfield | 418/201.1 |
| 2,297,196 | A | | 9/1942 | Berger | 60/337 |
| 2,406,388 | A | | 8/1946 | Larrecq | 184/6.12 |
| 2,519,122 | A | | 8/1950 | Dence | 184/11.1 |
| 2,646,210 | A | | 7/1953 | Kohlmann et al. | 417/407 |
| 2,645,305 | A | | 8/1953 | Roos | 184/11.1 |
| 2,695,468 | A | | 11/1954 | Price | 415/122.1 |
| 2,714,428 | A | * | 8/1955 | Green | 184/11.1 |
| 2,828,907 | A | | 4/1958 | Oehrli | 415/122.1 |
| 2,950,943 | A | * | 8/1960 | Forrest | 184/13.1 |
| 2,973,894 | A | | 3/1961 | Kimball et al. | 415/122.1 |
| 2,976,438 | A | | 3/1961 | Luber et al. | 310/83 |
| RE24,991 | E | | 5/1961 | Alexandrescu | 60/363 |
| 3,065,822 | A | | 11/1962 | McAfee et al. | 184/11.1 |
| 3,144,097 | A | * | 8/1964 | Ebert | 184/13.1 |
| 3,163,999 | A | | 1/1965 | Ditzler et al. | 415/206 |
| 3,299,655 | A | | 1/1967 | Rayner et al. | 62/193 |
| 3,508,630 | A | | 4/1970 | Keller et al. | 184/11.1 |
| 3,601,515 | A | * | 8/1971 | Pelizzoni | 184/6.12 |
| 3,618,711 | A | | 11/1971 | Vollmer | |
| 3,625,310 | A | | 12/1971 | Herrick | 184/6.12 |
| 3,734,637 | A | | 5/1973 | Beck Jr. | 415/122.1 |
| 3,809,493 | A | | 5/1974 | Pilarczyk | 415/122.1 |
| 4,090,588 | A | | 5/1978 | Willover | 184/11.2 |
| 4,171,137 | A | | 10/1979 | Aizu et al. | |
| 4,213,307 | A | | 7/1980 | Watson | |
| 4,423,710 | A | | 1/1984 | Williams | |
| 4,495,830 | A | | 1/1985 | Yasue et al. | 74/467 |
| 4,502,837 | A | | 3/1985 | Blair et al. | 415/198.1 |
| 4,586,468 | A | | 5/1986 | Dzioba | 147/364 |
| 4,653,976 | A | | 3/1987 | Blair et al. | 415/198.1 |
| 4,687,411 | A | | 8/1987 | Maeda et al. | 415/122 R |
| 4,752,193 | A | | 6/1988 | Horler | 184/6.11 |
| 5,105,793 | A | | 4/1992 | Winkelmann et al. | 123/559.1 |
| 5,224,459 | A | | 7/1993 | Middlebrook | 123/559.1 |
| 5,241,932 | A | | 9/1993 | Everts | 184/11.1 |
| 5,281,116 | A | | 1/1994 | Gwin | |
| 5,301,771 | A | | 4/1994 | Sishtla et al. | 184/6.16 |
| 5,375,573 | A | | 12/1994 | Bowman | 123/196 R |
| 5,404,964 | A | | 4/1995 | Zinsmeyer et al. | 123/559.1 |
| 5,423,304 | A | | 6/1995 | Lawrence et al. | 123/559.1 |
| 5,425,345 | A | | 6/1995 | Lawrence et al. | 123/559.1 |
| 5,579,735 | A | | 12/1996 | Todero et al. | 123/317 |
| 5,638,796 | A | | 6/1997 | Adams, III et al. | 417/423.13 |
| 5,685,699 | A | | 11/1997 | Holmes et al. | 417/423.1 |
| 5,887,576 | A | | 3/1999 | Wheeler, Jr. et al. | 123/559.1 |
| 5,997,260 | A | | 12/1999 | Genter et al. | 123/559.1 |
| 6,129,510 | A | | 10/2000 | Martin | 123/559.1 |
| 6,192,871 | B1 | | 2/2001 | Middlebrook | 123/559.1 |
| 6,293,263 | B1 | | 9/2001 | Middlebrook | 123/559.1 |
| 6,318,346 | B1 | | 11/2001 | Martin | 123/559.1 |
| 6,343,794 | B1 | * | 2/2002 | Brown | 277/423 |
| 6,439,208 | B1 | | 8/2002 | Jones | 123/559.1 |
| 6,460,656 | B1 | * | 10/2002 | Jones et al. | 184/13.1 |
| 6,478,016 | B1 | | 11/2002 | Roderique | 123/559.1 |
| 6,478,469 | B1 | | 11/2002 | Jones | 123/559.1 |
| 6,516,789 | B1 | | 2/2003 | Jones | 123/559.1 |
| 2002/0096156 | A1 | | 7/2002 | Palazzolo et al. | 123/559.1 |
| 2006/0073303 | A1 | * | 4/2006 | Bloch et al. | 428/66.6 |
| 2008/0026175 | A1 | * | 1/2008 | Bloch et al. | 428/66.6 |

OTHER PUBLICATIONS

Accessible Technologies, Inc. brochure entitled "ProCharger Centrifugal Supercharger Systems" (published at least as early as Jun. 1997).

Fletch's Carbureted 5.0 Mustangs, Section on Technology, Suddenly, It's 1966 Again—But Better, 1998-2002, available at http://www.jason.fletcher.net/tech/paxton/paxton.htm (last visited Nov. 17, 2004) (citing Steve Lancaster, Mustang Illustrated. (Nov, 1998)).

Fletch's Carbureted 5.0 Mustangs, Section on Technology, Suddenly, It's 1966 Again—But Better, 1998-2002, available at http://www.jason.fletcher.net/tech/paxton/paxtonphotos.htm (last visited Nov. 17, 2004) (citing Steve Lancaster, Mustang Illustrated. (Nov. 1998)).

Folke Richardz, *Lubrication of Gears*, in Gear Handbook. The Design, Manufacture, and Application of Gears 15-1 (Darle W. Dudley ed., 1962).

Letter from Richard E. Lyon, Jr., Holland & Knight LLP, to Andrew G. Colombo, Hovey Williams LLP (Apr. 29, 2008).

* cited by examiner

CENTRIFUGAL COMPRESSOR WITH IMPROVED LUBRICATION SYSTEM FOR GEAR-TYPE TRANSMISSION

RELATED APPLICATIONS

This application is a continuation of application Ser. No. 10/641,619, filed Aug. 14, 2003, now U.S. Pat. No. 7,299,792, entitled CENTRIFUGAL COMPRESSOR WITH IMPROVED LUBRICATION SYSTEM FOR GEAR-TYPE TRANSMISSION, which is a continuation-in-part application of application Ser. No. 10/248,358, filed Jan. 13, 2003 and entitled CENTRIFUGAL SUPERCHARGER HAVING LUBRICATING SLINGER, now abandoned, which is a continuation application of application Ser. No. 10/064,640, filed Aug. 1, 2002, now U.S. Pat. No. 6,516,789, issued on Feb. 11, 2003, which is a continuation application of application Ser. No. 10/064,418, filed Jul. 11, 2002, now abandoned, which is a continuation application of application Ser. No. 09/668,223, filed Sep. 22, 2000, now U.S. Pat. No. 6,439,208, all of which are hereby incorporated by reference herein.

BACKGROUND OF THE INVENTION

1. Field of the Invention

The present invention relates generally to centrifugal compressors, such as a centrifugal supercharger for providing increased airflow to an engine. More particularly, the present invention concerns an improved transmission lubrication arrangement for effectively lubricating the transmission components that drivingly connect the impeller to the power source, without having to tap into the lubrication system for the engine and without limiting the transmission speed.

2. Discussion of Prior Art

Centrifugal superchargers are traditionally provided with an internal step-up transmission that serves to rotate the impeller significantly faster than the input shaft connected to the engine. It is particularly known to provide a centrifugal supercharger with an internal belt drive supported by prelubricated (e.g., grease-packed) bearing assemblies. Although this type of transmission eliminates the need for lubrication (except for that already provided with respect to the bearing assemblies), it is believed to have relatively low operational limitations that effectively prohibit the supercharger from generating large amounts of pressure increase and airflow. On the other hand, a number of conventional centrifugal superchargers, particularly the higher boost models, utilize a gear drive that must, along with the bearing assemblies supporting the gear drive, be continuously lubricated during operation. Those ordinarily skilled in the art will appreciate that gear-type transmissions generally have greater structural integrity and are able to transfer significantly more load than a belt-type transmission. However, a gear-type transmission typically requires dispersion of lubrication fluid generally throughout the transmission chamber.

In the past, such a lubrication requirement has been problematic. First, lubrication fluid is commonly supplied to the transmission chamber of the supercharger from the engine. This almost always requires a fluid line to be tapped into the oil reservoir of the engine, which is often considered highly undesirable. It might be possible to alternatively provide a separate lubrication reservoir dedicated solely to the supercharger, although such a circulating arrangement would obviously be costly and consume a considerable amount of valuable engine compartment space. With respect to either alternative, the manner in which lubrication fluid is typically directed to the transmission components (e.g, jets, wicking arrangements, etc.) is believed to be unreliable, ineffective and/or in other ways problematic.

Although a circulating arrangement for the lubrication system would be costly and space consuming as indicated above, there are some advantages to such a system. For example, the lubricant can be filtered and cooled externally to the supercharger prior to reentry. However, prior art recirculating systems suffer from the undesirable risks associated with tapping into the engine's lubrication system. Furthermore, the prior art recirculating systems are prone to flood, or excessively lubricate the transmission and are undesirably subject to the lubricant draining out of the transmission under certain conditions.

There are also "self-contained" friction ball driven (e.g., Bendix drive) superchargers. That is to say, a number of superchargers wholly contain the lubrication fluid therein. Those ordinarily skilled in the art will appreciate that the transmission chamber of such a supercharger is typically filled with lubrication fluid. It has been determined, however, that a fluid-filled transmission chamber actually reduces the load capacity of the supercharger, as a result of the significant hydraulic separation forces caused by flooding the transmission and bearing assemblies. Furthermore, this type of construction adds heat and fails to provide sufficient cooling of the transmission.

OBJECTS AND SUMMARY OF THE INVENTION

Responsive to these and other problems, an important object of the present invention is to provide a supercharger that is capable of providing relatively high amounts of airflow (e.g., 1800 gasoline horsepower). It is also an important object of the present invention to provide a supercharger that is self-contained, such that the lubrication system for the transmission is confined to the supercharger itself. Alternatively, it is an important object of the present invention to provide a supercharger with a dedicated lubrication system, such that the lubrication system for the transmission is dedicated to the supercharger itself and not also associated with the engine. In addition, an important object of the present invention is to provide a transmission lubrication configuration that has virtually no limiting effect on the boost provided by the supercharger. Another important object of the present invention is to provide a supercharger having a gear-type transmission and an associated lubrication system that assuredly provides sufficient and effective lubrication to the transmission components. Yet another important object of the present invention is to provide a supercharger having a durable, simple and inexpensive construction.

In accordance with these and other objects evident from the following description of the preferred embodiments, one aspect of the present invention concerns a supercharger having a case that defines a compressor chamber and a transmission chamber. The rotatable impeller in the compressor chamber is drivingly connected to a power source (e.g., an engine) by the transmission. The transmission chamber includes a fluid reservoir portion in which lubrication fluid is located, and at least part of the transmission is located within the transmission chamber but outside the reservoir portion. A fluid-propelling element serves to propel lubrication fluid from the reservoir portion of the transmission chamber to the part of the transmission. This configuration consequently permits the supercharger to be entirely self-contained, with the lubrication fluid being located entirely within the transmission chamber. Furthermore, the part of the transmission outside the reservoir portion is not subjected to significant hydraulic separating forces, which would otherwise be produced if it was submerged. Moreover, the fluid-propelling element is preferably arranged to create a fluid mist within the transmission chamber. It is believed that such an environment ensures effective and reliable lubrication of the transmission components.

A second aspect of the present invention also contemplates utilizing a rotatable component of the transmission as the fluid propelling element. The component projects into the reservoir portion of the transmission chamber and slings lubricant to the part of the transmission located in the transmission chamber but outside the reservoir portion thereof. In the preferred embodiment, the rotatable component comprises the relatively low speed drive gear provided on the input shaft of the supercharger.

A third aspect of the present invention concerns a compressor broadly including a case presenting a compressor chamber and a transmission chamber, a rotatable impeller in the compressor chamber, a transmission operable to drivingly connect the impeller to a power source, a lubricant sump operable to contain lubricant therein, and a sump pump operable to cause the exchange of lubricant between the transmission chamber and sump when powered. The lubricant sump is in fluid communication with the transmission chamber so as to permit exchange of lubricant between the transmission chamber and sump. The sump pump is powered by the transmission.

A fourth aspect of the present invention concerns a compressor broadly including a case presenting a compressor chamber and a transmission chamber, a rotatable impeller in the compressor chamber, a transmission operable to drivingly connect the impeller to a power source, a lubricant sump operable to contain lubricant therein, and a pump operable to cause the exchange of lubricant between the transmission chamber and sump. The case presents a lubricant inlet port through which lubricant is supplied to the transmission chamber and a lubricant outlet port through which lubricant is exhausted from the transmission chamber. The transmission chamber presents a lowermost margin. The outlet port is spaced above the lowermost margin, such that a lubricant reservoir portion of the transmission chamber is defined therebetween. At least part of the transmission is located in the transmission chamber but outside the lubricant reservoir portion thereof. The lubricant sump is in fluid communication with the transmission chamber via the inlet and outlet ports so as to permit exchange of lubricant between the transmission chamber and sump.

A fifth aspect of the present invention concerns a compressor broadly including a case presenting a compressor chamber and a transmission chamber having a lubricant reservoir portion, a lubrication quantity of lubricant maintained within the reservoir portion, a rotatable impeller in the compressor chamber, a transmission operable to drivingly connect the impeller to a power source, with at least part of the transmission being located in the transmission chamber but outside the lubricant reservoir portion thereof, and a lubricant reserve system. The reserve system includes a reserve quantity of lubricant contained within the lubricant reserve system, a lubricant sump operable to contain at least part of the reserve quantity of lubricant therein and being in fluid communication with the transmission chamber, and a pump operable to cause the exchange of the lubrication and reserve quantities of lubricant.

A sixth aspect of the present invention concerns a compressor broadly including a case presenting a compressor chamber and a transmission chamber, a rotatable impeller in the compressor chamber, a transmission operable to drivingly connect the impeller to a power source, a lubrication pump operable to transfer lubricant to the transmission, a lubricant sump operable to contain lubricant therein, and a sump pump operable to pump lubricant from the sump to the transmission chamber when powered. The lubricant sump is in fluid communication with the transmission chamber so as to permit exchange of lubricant between the transmission chamber and sump. The sump pump is drivingly connected to the lubrication pump.

A seventh aspect of the present invention concerns a compressor broadly including a case presenting a compressor chamber and a transmission chamber, a rotatable impeller in the compressor chamber, a transmission operable to drivingly connect the impeller to a power source, a lubricant sump operable to contain lubricant therein, and a pump located within the case. The transmission chamber has a lubricant reservoir portion configured to hold a quantity of lubricant therein. At least part of the transmission is located in the transmission chamber but outside the lubricant reservoir portion thereof. The lubricant sump is in fluid communication with the transmission chamber so as to permit exchange of lubricant between the transmission chamber and sump. The pump is operable to pump lubricant from the sump to the transmission chamber and to transfer lubricant within the reservoir portion to said at least part of the transmission.

An eighth aspect of the present invention concerns a compressor broadly including a case presenting a compressor chamber and a transmission chamber, a rotatable impeller in the compressor chamber, a transmission operable to drivingly connect the impeller to a power source, a lubricant sump operable to contain lubricant therein, and a sump pump operable to cause the exchange of lubricant between the transmission chamber and sump when powered. The lubricant sump is in fluid communication with the transmission chamber so as to permit exchange of lubricant between the transmission chamber and sump. The sump pump is located within the case.

While many of the above aspects of the present invention are directed to compressors, it will be appreciated that the most preferred applications of the present invention embodying these aspects are centrifugal superchargers for supercharging the engine of a vehicle.

Other aspects and advantages of the present invention will be apparent from the following detailed description of the preferred embodiment and the accompanying drawing figures.

BRIEF DESCRIPTION OF THE DRAWING FIGURES

Several embodiments of the invention are described in detail below with reference to the attached drawing figures, wherein.

Figure 17:
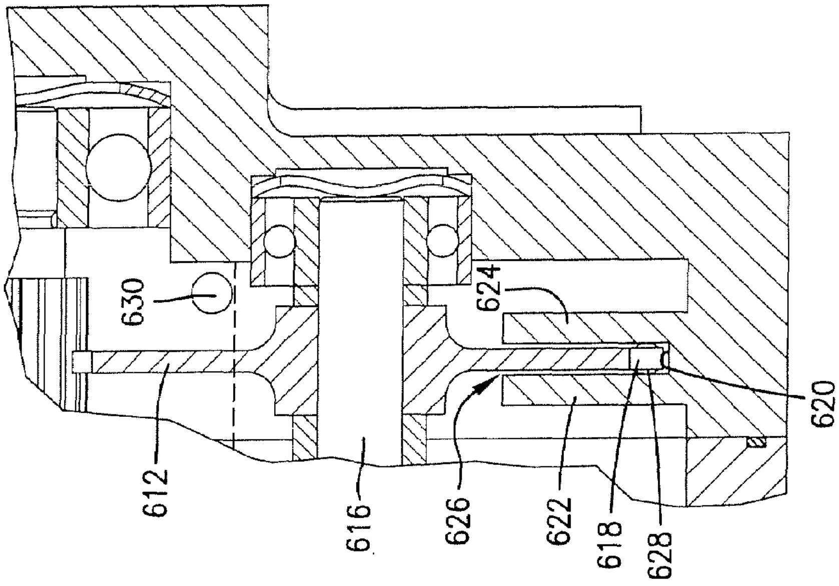
Figure 16:
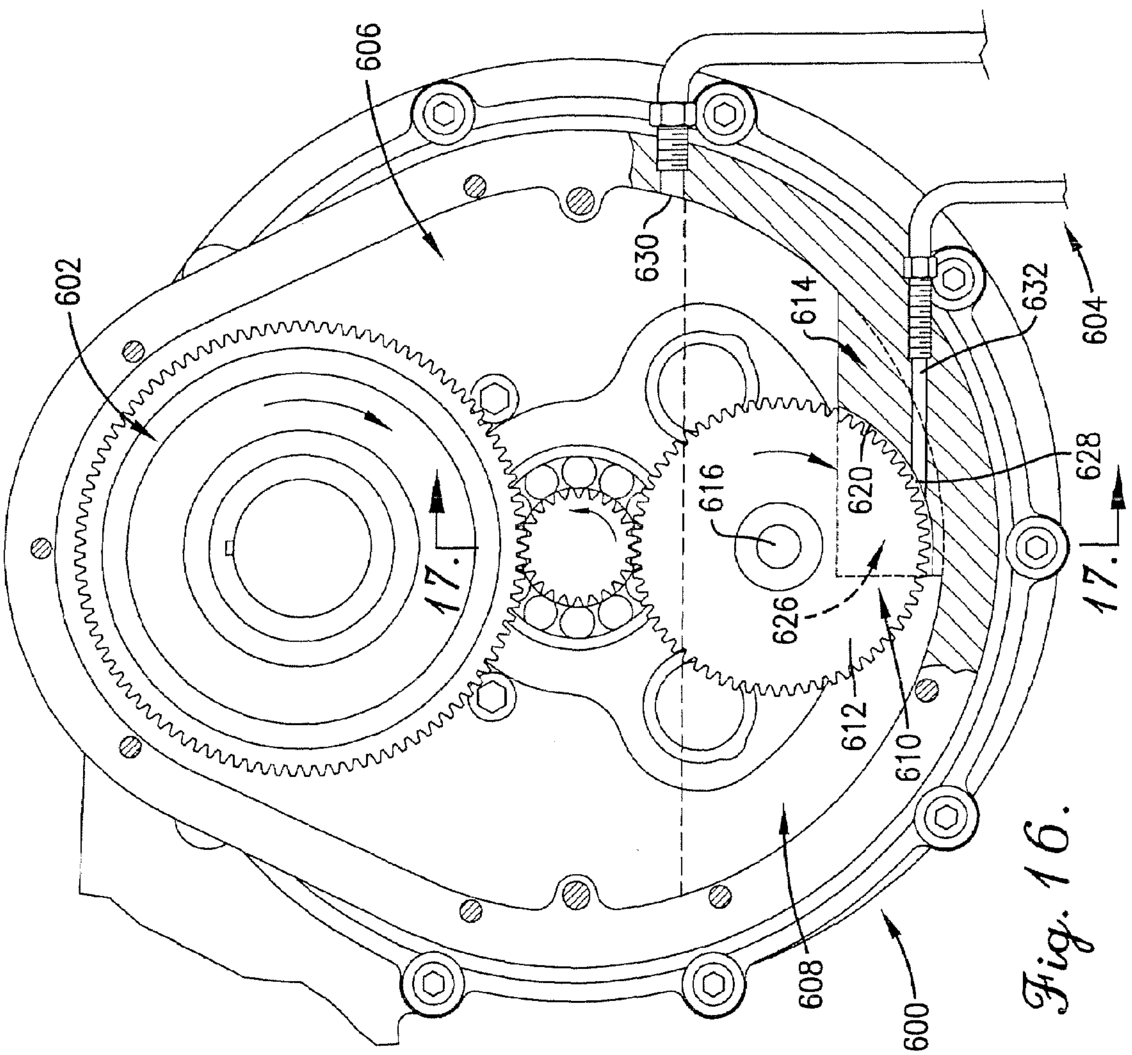

FIG. 16 is a front elevational view of a seventh embodiment of the present invention, wherein the lubrication slinging element also functions as the pump for the dedicated lubricant reserve system with a portion of the casing being shown in section to illustrate the segmented pump housing and the system's inlet and outlet ports; and FIG. 17 is an enlarged cross-sectional view of the supercharger taken generally along line 17-17 of FIG. 16, particularly illustrating the segmented pump housing enclosing a segment of the slinging element and surrounding the inlet port of the lubricant reserve system.

DETAILED DESCRIPTION OF THE PREFERRED EMBODIMENTS

Figure 1:
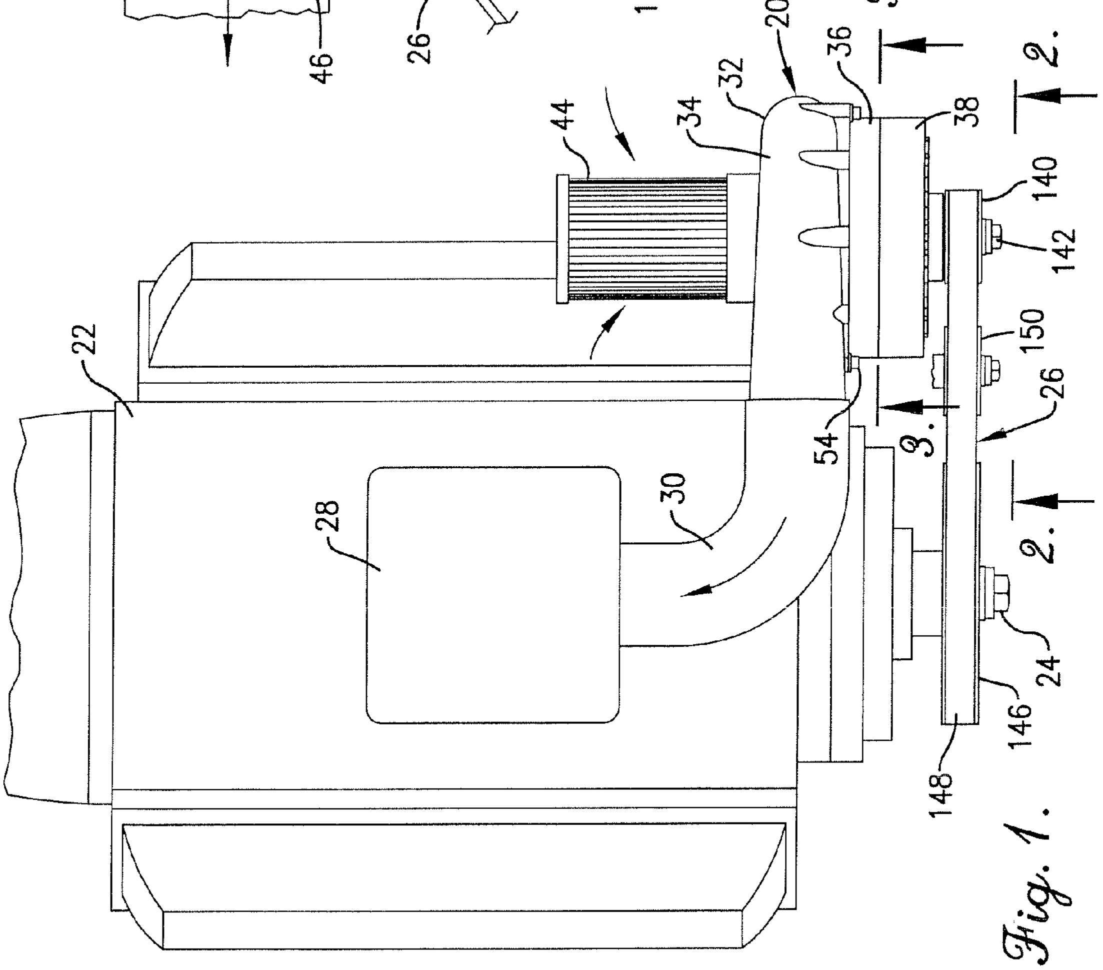
FIG. 1 is a fragmentary, partially schematic plan view of an internal combustion engine including a centrifugal supercharger constructed in accordance with the principles of the present invention.

Turning initially to FIG. 1, the supercharger 20 selected for illustration is shown in use with an internal combustion engine 22 of a vehicle such as a boat or automobile. Although the illustrated engine 22 has eight cylinders, the principles of the present invention are equally applicable to various other types of engines. It is noted, however, that the supercharger 20 is preferably driven directly by the engine 22, with the crankshaft 24 and a belt drive 26 providing driving power to the supercharger 20. Moreover, the supercharger 20 is connected to the engine intake 28 (e.g., an intake plenum box) by a conduit 30, such that pressurized air generated by the supercharger 20 is directed to the intake 28. Again, the principles of the present invention are not limited to the illustrated application, but rather the inventive supercharger 20 may be associated with any system in which a highly pressurized air stream is desired. For example, it is entirely within the ambit of the present invention to utilize the supercharger 20 in various other types of reciprocating engines. Additionally, the supercharger 20 could be driven off of the engine 22 by a chain drive (not shown).

The illustrated supercharger 20 includes a case 32 that defines compressor and transmission chambers as identified hereinbelow. As perhaps best shown in FIG. 4, the preferred case 32 generally includes three main sections 34,36,38 that are formed of any suitable material (e.g., polished cast steel) and interconnected as will be described. It is within the ambit of the present invention to utilize relatively softer materials on the inside of the case 32, for example as an insert, particularly surrounding the compressor chamber (as described below), to reduce the tolerances between the inside of the case 32 and the moving components housed therein while reducing the risk of catastrophic failure by unintended contact of one or more of those components with the case 32. One suitable preferred soft material insert is disclosed in copending application for U.S. patent Ser. No. 10/349,411, filed Jan. 22, 2003, entitled A METHOD AND APPARATUS FOR INCREASING THE ADIABATIC EFFICIENCY OF A CENTRIFUGAL SUPERCHARGER, which claims the priority of provisional U.S. Application Ser. No. 60/430,814, filed Dec. 4, 2002 and bearing the same title, both of which are hereby incorporated by reference herein.

The case sections 34 and 36 cooperate to define a compressor chamber 40 in which incoming fluid (e.g., air, air/fuel mixture, etc.) is pressurized and accelerated. The case section 34 presents a central inlet opening 42 (see FIG. 4) through which fluid enters the chamber 40. A filter 44 (see FIG. 1) is preferably provided at the inlet opening 42, as shown, or somewhere upstream from the opening 42. Although not illustrated, the inlet opening 42 may alternatively communicate with a forwardly open conduit (not shown) that extends toward the front of the powered vehicle, such that air flow to the supercharger 20 is facilitated when the vehicle is moving in a forward direction. The case section 34 is configured in such a manner that a portion 40*a* of the compressor chamber 40 extends circumferentially around the inlet opening 42 to form a volute of progressively increasing diameter. The volute portion 40*a* of the compressor chamber 40 terminates at a tangential outlet opening 46 (see FIGS. 2 and 3), with the latter communicating with the engine intake 28 via conduit 30 (see also FIG. 1). In this regard, fluid entering the illustrated compressor chamber 40 flows axially through the inlet opening 42, is propelled generally radially into the volute portion 40*a*, and then directed along a generally circular path to the outlet opening 46.

Figure 4:
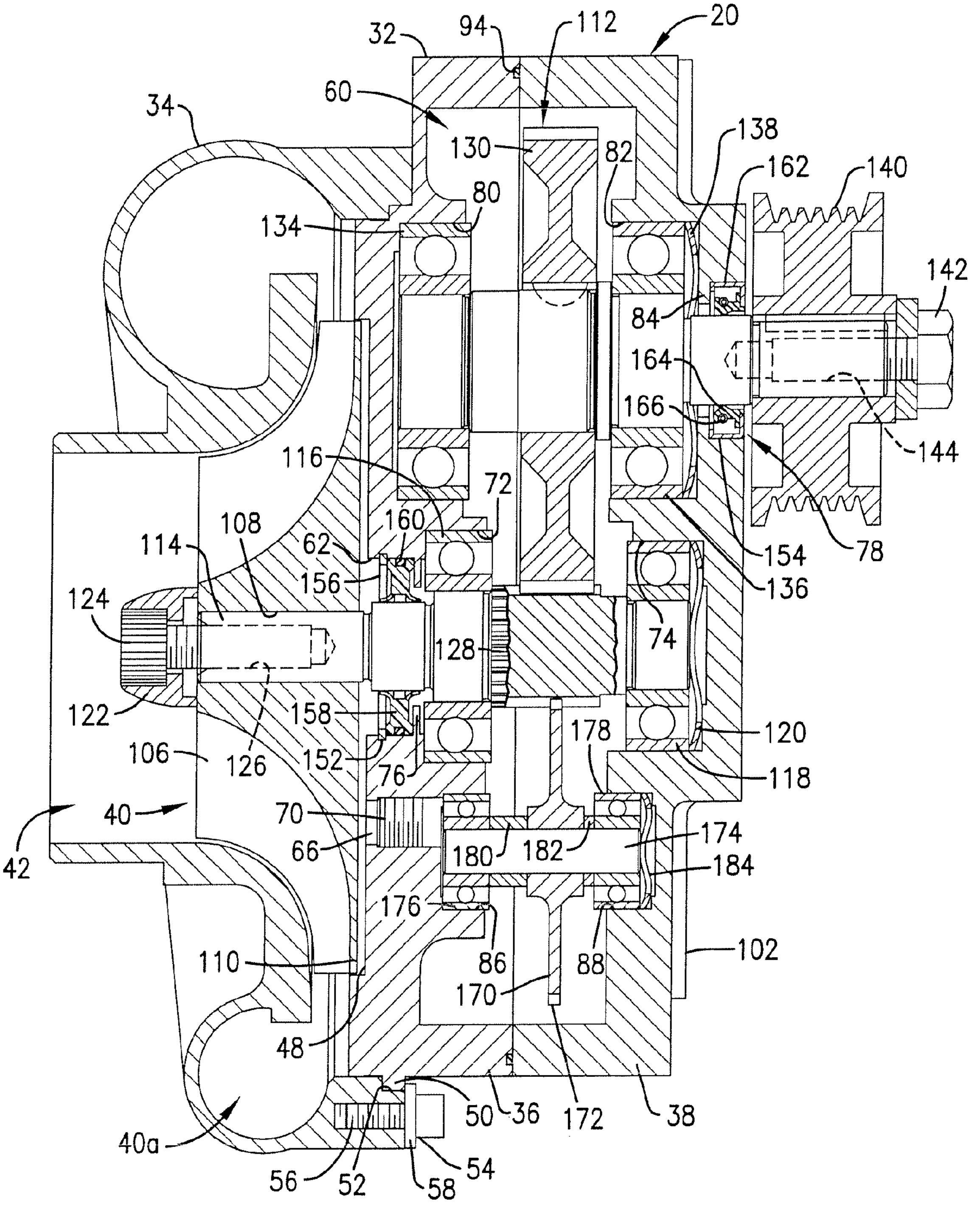
FIG. 4 is an even further enlarged cross-sectional view of the supercharger taken generally along line 4-4 of FIG. 3, particularly illustrating both the compressor and transmission chambers.

As shown in FIG. 4, the case section 36 presents a circular recess 48 for purposes which will be described. In addition, the section 36 presents an outwardly projecting lip 50 that extends partly around the perimeter thereof (e.g., see FIGS. 2 and 4). The lip 50 is received in a complemental groove 52 defined in the case section 34, and a plurality of fastener assemblies 54 serve to secure the case sections 34 and 36 to one another. As particularly shown in FIG. 4, each of the fastener assemblies 54 preferably includes a threaded screw 56 received in the case section 34 and a washer 58 pressed against the lip 50.

Figure 3:
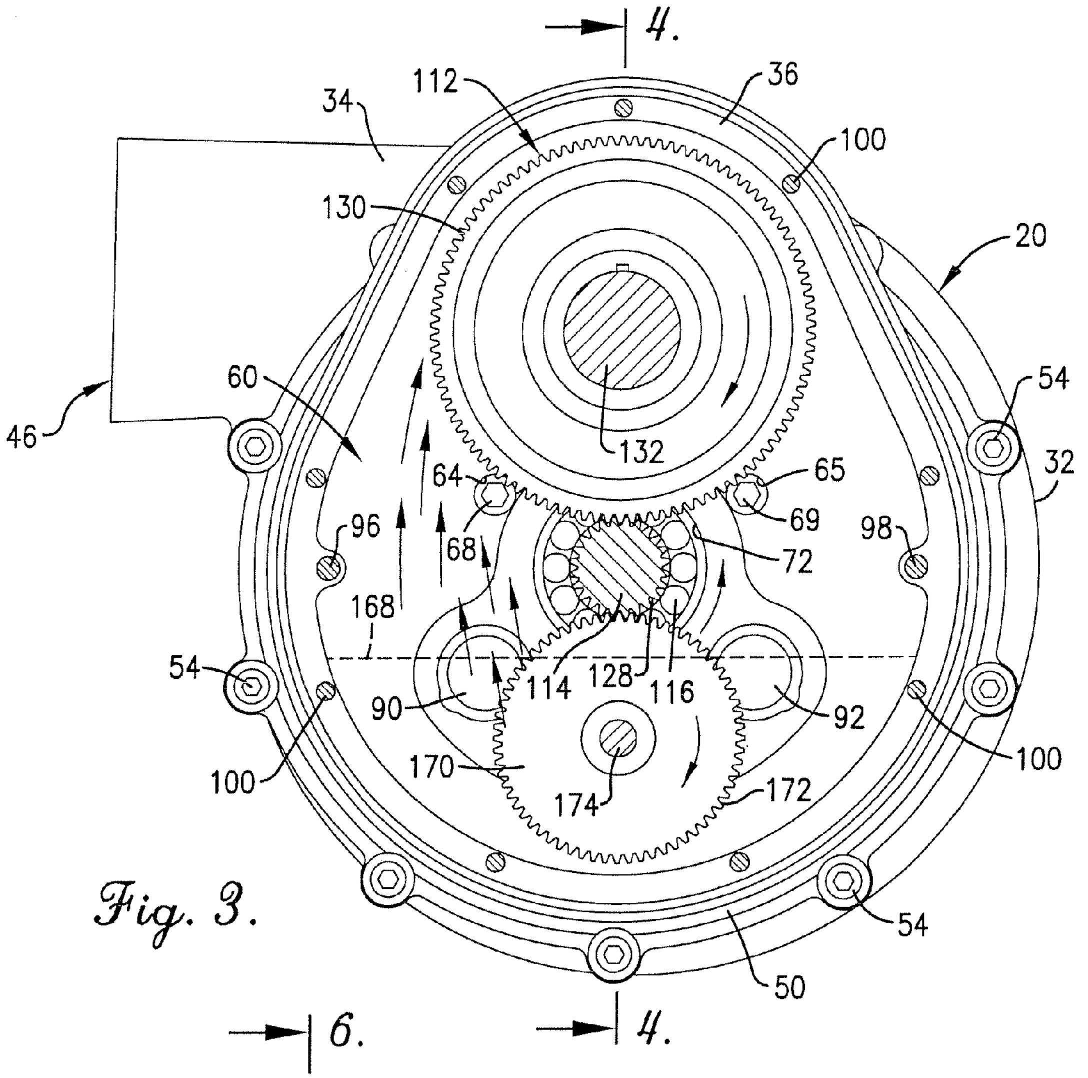
FIG. 3 is an enlarged cross-sectional view of the supercharger taken generally along line 3-3 of FIG. 1, particularly illustrating the transmission chamber and the components located therein.

The middle case section 36 also cooperates with the case section 38 to define a transmission chamber 60 (see FIGS. 3 and 4). As particularly shown in FIG. 3, the transmission chamber 60 is preferably teardrop shaped, with the bottom being wider than the top. An impeller shaft opening 62 that is concentric with the inlet opening 42 extends through the case section 36 from the compressor chamber 40 to the transmission chamber 60. A set of internally threaded passageways 64,65,66 also extend through the case section 36, with each of the passageways 64,65,66 normally being sealed by a respective threaded plug 68,69,70. Except for the shaft opening 62 and the passageways 64,65,66, the chambers 40 and 60 are otherwise separated from one another by the case section 36. Defined in the case sections 36 and 38 in axial alignment with the shaft opening 62 are a pair of opposed bearing assembly sockets 72 and 74. An inwardly projecting dividing wall 76 is located along the shaft opening 62 to present a seal recess for purposes which will be described.

The case section 38 similarly includes an input shaft opening 78 that is spaced upwardly from the bearing assembly socket 74. Similar to the impeller shaft opening 62, the input shaft opening 78 is axially aligned with opposed bearing assembly sockets 80 and 82 defined in the case sections 36 and 38. There is likewise an inwardly projecting dividing wall 84 alongside the bearing assembly socket 82 to present a seal recess as will be described. In the preferred embodiment, a pair of opposed, relatively small bearing assembly sockets 86 and 88 defined in the case sections 36 and 38 are utilized, although two additional pairs of sockets 90 and 92 (only the sockets defined in the case section 36 being shown in FIG. 3) are provided in the transmission chamber 60. As will be described, the three pairs of sockets permit the supercharger to be mounted at various angles, while ensuring sufficient and effective dispersion of lubrication fluid within the transmission chamber 60. It is noted that the passageway 66 projects from the center socket 86 (see FIG. 4).

An endless O-ring 94 retained within a continuous groove defined in the case section 36 provides a seal between the case sections 36 and 38 (see FIG. 4). A pair of alignment rods 96 and 98 (see FIG. 3) ensure proper positioning of the case sections 36 and 38 relative to one another, as well as a series of attachment screws 100 (see also FIG. 2).

Figure 2:
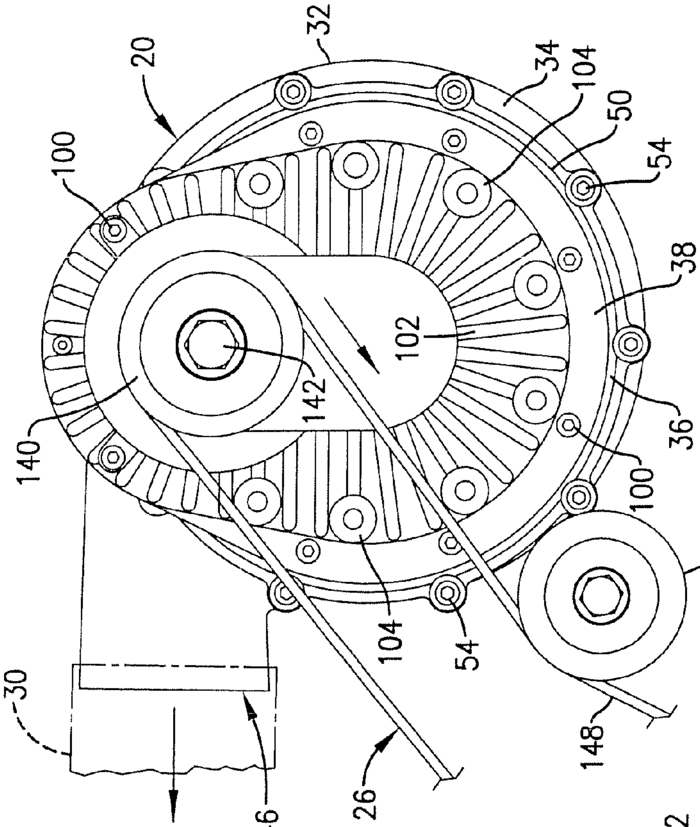
FIG. 2 is an enlarged, fragmentary front elevational view of the engine taken along line 2-2 of FIG. 1.

As particularly shown in FIG. 2, the illustrated case section 38 presents a finned outer face 102 for promoting heat exchange between the transmission chamber, particularly the lubrication fluid, and atmosphere. The outer face 102 is also provided with a plurality of mounting bosses 104, each being tapped so that a mounting bolt (not shown) may be threaded therein to fasten the supercharger 20 to a mounting bracket (also not shown) fixed to the engine 22.

In the usual manner, the supercharger 20 includes a rotatable impeller 106 located within the compressor chamber 40 (see FIG. 4). The impeller 106 is preferably machined from a billet of 7075 T-6 aircraft aluminum, although other suitable materials (e.g., cast aluminum) may be used. It is further preferred to use the impeller commercially available from the assignee of record of the invention claimed herein. However, the impeller 106 may be variously configured without departing from the spirit of the present invention. With respect to the preferred embodiment, the impeller 106, regardless of its design, induces and causes fluid to flow through the compressor chamber 40 as hereinabove described. It is particularly noted that the impeller 106 is provided with a central mounting hole 108. In addition, the impeller 106 has a circular, solid base 110 that spans and is received in the recess 48.

The impeller 106 is drivingly connected to the belt drive 26 of the engine 22 by a transmission 112 located generally in the transmission chamber 60. The transmission 112 may be variously configured but at least some component(s) thereof require(s) continuous lubrication during operation.

In the preferred embodiment, the transmission 112 includes an impeller shaft 114 rotatably supported by a pair of bearing assemblies 116 and 118 press fit within respective ones of the sockets 72 and 74. In the usual manner, a wavy spring washer 120 is provided in at least one of the sockets 72 and 74. As is sometimes common because of the extremely high rotational speeds of the impeller 106, additional bearing assemblies (not shown) may be used to support the impeller shaft 114. The construction of the various bearing assemblies used in the illustrated supercharger 20 will not be described in detail, with the understanding that each illustrated assembly includes an inner race suitably fixed (e.g., press fit) to the shaft rotatably supported by the assembly, an outer race suitably fixed to the case section to which the assembly is mounted, and a ball and cage assembly retained between the races. Furthermore, the illustrated bearing assemblies are not prelubricated and require continuous lubrication during operation. However, the principles of the present invention are equally applicable to various other types of bearing assemblies (e.g., prelubricated bearing assemblies, ceramic balls, rolling bearings, tapered bearings, etc.), as well as other types of bearing arrangements, including multiple bearing arrangements. Suitable preferred multiple bearing arrangements are disclosed in applicant's U.S. Pat. No. 6,478,469, issued Nov. 12, 2002, entitled VELOCITY VARIANCE REDUCING MULTIPLE BEARING ARRANGEMENT FOR IMPELLER SHAFT OF CENTRIFUGAL SUPERCHARGER, as well as copending applications for U.S. patent Ser. Nos. 09/683,871 and 10/064,835, filed Feb. 26, 2002, and Aug. 22, 2002, respectively, both bearing the same title as the '469 patent, all of which are hereby incorporated by reference herein.

The illustrated impeller shaft 114 projects through the opening 62 and into the compressor chamber 40. The mounting hole 108 of the impeller 106 receives the end of the shaft 114 therein, with the impeller 106 preferably being pressed onto the shaft 114 and retained thereon by a cap 122. It is noted that the cap 122 is secured in place by a screw 124 threaded into an axial bore 126 of the shaft 114. When it is desired to remove the impeller 106, the outer case section 34 is detached from the middle case section 36, the retaining screw 124 and cap 122 are removed, the plugs 68,69,70 are unscrewed from their respective passageways 64,65,66, and a tool may then be inserted through one or all of the passageways 68,69,70 to engage the impeller base 110 and force the impeller 106 off the end of the shaft 114.

The impeller shaft 114 is preferably machined to include a pinion 128 located between the bearing assemblies 116 and 118. The pinion 128 intermeshes with a relatively larger gear 130 supported by an input shaft 132. The gear 130 is preferably keyed to the shaft 132, although these components may be fixedly interconnected in any other suitable manner. Similar to the impeller shaft 114, a pair of bearing assemblies 134 and 136 press fit within respective ones of the sockets 80 and 82 rotatably support the input shaft 132. Additionally, a wavy spring washer 138 is provided in the socket 82 adjacent the dividing wall 84. The input shaft 132 projects through the shaft opening 78 and beyond the outer face 102 of the case section 38. The belt drive 26 includes a driven sheave 140 keyed to the outwardly projecting portion of the input shaft

132. The driven sheave 140 is further retained on the shaft 132 by a screw 142 threaded into an axial bore 144 of the shaft 132. The illustrated belt drive 26 further includes a drive sheave 146 fixed to the crank shaft 24, a belt 148 entraining the sheaves 140 and 146, and an idler sheave 150 suitably tensioning the belt 148. Thus, rotation of the crank shaft 24 effects rotation of the impeller 106.

Those ordinarily skilled in the art will appreciate that the gear-type transmission 112 of the preferred embodiment produces noise that is noticeably greater than a belt drive. It has been determined that the impeller 106 actually amplifies the noise of the transmission 112, and the noise typically associated with a gear driven supercharger is normally considered undesirable. In this regard, the impeller shaft 114 is preferably designed to dampen noise that might otherwise propagate through the shaft 114 to the impeller 106. Such a shaft construction is disclosed in contemporaneously filed application for U.S. patent Ser. No. 09/669,018, filed Sep. 22, 2000, entitled GEAR DRIVEN SUPERCHARGER HAVING NOISE REDUCING IMPELLER SHAFT, which is hereby incorporated by reference herein as is necessary for a full and complete understanding of the present invention.

Because lubrication fluid will be dispersed throughout the transmission chamber 60 in the manner described below, seal assemblies 152 and 154 are provided at the shaft openings 68 and 78, respectively. Turning first to the impeller shaft seal assembly 152, a retaining ring 156 maintains a seal 158 against the dividing wall 76. The seal 158 is provided with a circumferential O-ring 160 that sealingly engages the case section 34. The seal 158 is formed of any suitable material, such as that available under the designation "TEFLON", and preferably provides double or redundant sealing contact with the impeller shaft 114. On the other hand, the input shaft seal assembly 154 includes a metal case 162 press fit within the case section 38 against the dividing wall 84. The case 162 houses a rubber seal 164 that is sealingly retained between the input shaft 132 and case 162 by a spring 166. The illustrated seal assemblies 152 and 154 are preferred but shall be considered as illustrative only, and the principles of the present invention are equally applicable to a supercharger using various other types of seals.

Those ordinarily skilled in the art will appreciate that the gears 128,130 and, in the preferred embodiment, the bearing assemblies 116,118,134,136 require lubrication during operation. The supercharger 20 is preferably self-contained such that the lubrication fluid is maintained within the transmission chamber 60. As shown in FIG. 3, the illustrated supercharger 20 is oriented so that the gears 128 and 130 are arranged along a vertical centerline of the transmission chamber 60, and the pinion 128 is spaced well above the lowermost boundary of the transmission chamber 60. The portion of the transmission chamber 60 below the sockets 72,74 preferably defines a fluid reservoir that is filled with lubrication fluid. In this regard, all of the illustrated transmission is located above or outside the fluid reservoir portion of the chamber 60, although it is entirely within the ambit of the present invention to submerge part of the transmission if desired. For example, if the bearing assemblies 116 and 118 for the impeller shaft 114 are alternatively lubricated by some other means (e.g., they are prelubricated), the top of the fluid reservoir portion is preferably located at or just below the pinion 128. As will be described with respect to an alternative embodiment of the present invention, it is also possible to partly submerge one of the gears of the transmission, although the partly submerged gear is preferably rotated at a relatively low speed and not directly intermeshing with the high speed components (e.g., the pinion on the impeller shaft) of the transmission. It is, however, most preferred that the transmission 112 be located entirely outside the reservoir portion of the transmission chamber. This helps in reducing the risk of flooding the lubricated components of the transmission 112 with lubricant and thereby subjecting these components to excessive hydraulic separation forces.

A dashed line 168 in FIG. 3 represents the top boundary of the reservoir portion of the transmission chamber 60, as well as the surface of the fluid contained within the transmission chamber 60. That is to say, the quantity of fluid within the transmission chamber 60 essentially defines the fluid reservoir portion. The case may be provided with a window (not shown) that allows the user to view the fluid level. In addition, the case may be provided with normally closed fluid drain and fluid fill openings (not shown) communicating with the transmission chamber 60 to facilitate changing of the lubrication fluid, replenishment of the fluid, etc.

Moreover, the supercharger 20 is provided with a device for propelling lubrication fluid to the transmission 112. In the embodiment illustrated in FIGS. 1-4, a circular fluid-slinging disc 170 is partly submerged within the lubrication fluid, such that rotation of the disc 170 causes lubrication fluid to be dispersed throughout the upper portion of the transmission chamber 60 (i.e., the portion of the chamber 60 above the fluid surface). The illustrated disc 170 includes a toothed outer edge 172 that is specifically configured to intermesh with the pinion 128 (see FIG. 3), whereby rotation of the pinion 128 effects rotation of the disc 170. As shown in FIG. 4, the disc 120 is suitably fixed (i.e., press fit) to a shaft 174 and positioned between a pair of bearing assemblies 176 and 178 by respective spacers 180 and 182. The bearing assemblies 176 and 178 are press fit within respective ones of the sockets 86 and 88 and thereby serve to rotatably support the shaft 174 and disc 170 within the transmission chamber 60. If desired, the bearing assemblies 176 and 178 may be sealed from the fluid reservoir so that lubrication fluid from the reservoir does not flood, have direct ingress to, or otherwise affect operation of the assemblies 176 and 178. As with the other shaft assemblies, a wavy spring washer 184 is provided in the socket 88 adjacent the bearing assembly 178.

Because the illustrated supercharger 20 is disposed in the vertical orientation, the slinging disc 170 is preferably mounted between the lower, central sockets 86 and 88. However, it is entirely within the ambit of the present invention to alternatively mount the disc 170 between either pair of the other sockets 90 or 92. Such alternative mounting is particularly preferred if the supercharger 20 is mounted to the engine 22 in such a manner that the transmission chamber 60 is angularly offset relative to vertical. For example, if the supercharger 20 is mounted so that the transmission chamber 60 has been rotated in a clockwise direction compared to its upright orientation in FIG. 3, the disc 170 is desirably mounted between the pair of sockets 92. It will be appreciated that this ensures that the disc 170 is sufficiently submerged within lubricant to effect the desired lubrication of the transmission 112, without causing the impeller shaft bearing assemblies 116 and 118 to be submerged.

As shown in FIG. 3, the slinging disc 170 is preferably partly submerged such that a portion of the disc 170 projects upwardly out of the fluid. The amount the illustrated disc 170 projects out of the fluid will increase to some extent during operation, as a result of some of the fluid being dispersed throughout the transmission chamber 60. In the embodiment illustrated in FIGS. 1-4, the disc is approximately two and one-half inches in diameter and the above-surface segment is defined about an arc of approximately 95°; however, the dimension of the disc 170 and the degree to which it is submerged may vary as desired. For example, the slinging disc 170 need not be circular in shape, although it is preferred that the disc 170 be symmetric about its rotational axis. It may also be possible to completely submerge the slinging disc 170. For example, the supercharger 20 may be arranged so that the disc 170 is completely submerged but has sufficient displacement capability to propel fluid to those components of the transmission 112 requiring lubrication.

The operation of the engine 22 will cause the input shaft 132 to be rotated by the belt drive 26. The large gear 130 is consequently rotated as illustrated in FIG. 3, and the pinion is rotated in an opposite direction. The impeller 106 is rotated at incredibly high speeds (e.g., 40,000 to 80,000 rpm) to produce an extremely large amount of horsepower (e.g., 1800 gasoline hp).

Further, the slinging disc 170 is rotated in the same direction as the large gear 130. It is believed that at relatively slow speeds the toothed edge 172 of the disc 170 carries lubrication fluid to the pinion 128 and the fluid is in turn transferred to the large gear 130. The bearing assemblies 116,118,134,136 are believed to be lubricated by fluid pressed outwardly by the intermeshing contact of the disc 170 and pinion 128 and the pinion 128 and larger gear 130, as well as fluid being flung from the gears 128,130. Moreover, at relatively higher speeds, the disc 170 eventually creates a fluid mist that migrates throughout the entire upper portion of the transmission chamber 60 and lubricates all of the transmission components therein. Such an environment is highly desirable with the illustrated high speed transmission. It is also believed that the point at which the disc 170 creates the mist environment depends on the viscosity of the lubrication fluid and the relative velocity of the disc 170. This point is further believed to correspond with a cavitation state of the rotating disc 170. With respect to the preferred embodiment, the fluid reservoir is filled with any suitable lubrication fluid (e.g., oil, synthetic lubrication fluids, etc.). As a result of the size/diameter ratios of the sheaves 140,146 and gears 128,130, the speed of the disc 170 is significantly greater than the speed of the crankshaft 24. In the preferred embodiment, the rotational speed of the disc 170 ranges between zero and twenty-thousand revolutions per minute. It is also noted that the teeth of the edge 172 enhance the lubricant slinging action of the disc 170.

Rotation of the slinging disc 170, particularly when the disc is creating the mist environment, requires negligible power and the heat generated by disc 170 is also insignificant. It is believed that this is at least partly attributable to the fact that the disc 170 rotates at such high speeds and the lubricant has no opportunity to completely fill the voids defined between the teeth of the outer edge 172. Those ordinarily skilled in the art will appreciate that the mist environment created by the disc 172 provides "low pressure" lubrication to the transmission 112, which is believed to be highly desirable for the bearing assemblies 116,118,134,136 and, to a lesser extent, the gears 128,130. That is to say, the slinging disc 170 does not flood the transmission 112 or cause the transmission to be excessively lubricated. Finally, the operating load of the disc 170, and therefore the shaft 174 and bearing assemblies 176 and 178, is relatively low and these components need not have expensive, high strength constructions (e.g., the slinging disc 170 may have a minimum thickness of approximately one-twentieth inch).

It is noted that the principles of the present invention are equally applicable to various other supercharger configurations and alternative lubricant slinging devices. For example, the lubricant reservoir need not be located directly below the transmission 112. If desired, the reservoir portion of the transmission chamber could be laterally offset from the transmission, with the slinging disc being arranged to direct the lubrication fluid laterally toward the transmission. The configuration of the transmission chamber 60 may also be varied, although the illustrated shape is believed to most effectively enhance fluid flow to the lubricated transmission components. The transmission 112 itself may also be variously configured (e.g., the principles of the present invention are equally applicable to any transmission having at least one component that requires lubrication during operation and that has not been prelubricated). As previously noted, the transmission 112 provides driving connection between the impeller 106 and the belt drive 26; such that driving power is transferred from the input 132 shaft (connected to the belt drive 26), through the gears 128 and 130, and to the impeller shaft 114. The disc 170 is preferably outside the driving connection of the transmission so that at least substantially no driving power is transferred to the impeller 106 by the disc 170. With particular respect to the illustrated embodiment, the disc 170 is not drivingly connected between the belt drive 26 and the impeller 106. It is also possible to drive the slinging disc in some alternative manner, rather than having it drivingly contact one of the transmission components. For example, the slinging disc may alternatively be driven by a separate drive or indirectly drivingly coupled to the transmission by a drive train that is not transferring power from the power input source to the impeller. The device for directing lubricant to the transmission may be further varied, as it is only critical that the device be capable of propelling lubricant from a reservoir portion of the transmission chamber to those components outside the reservoir portion requiring lubrication.

Figure 5:
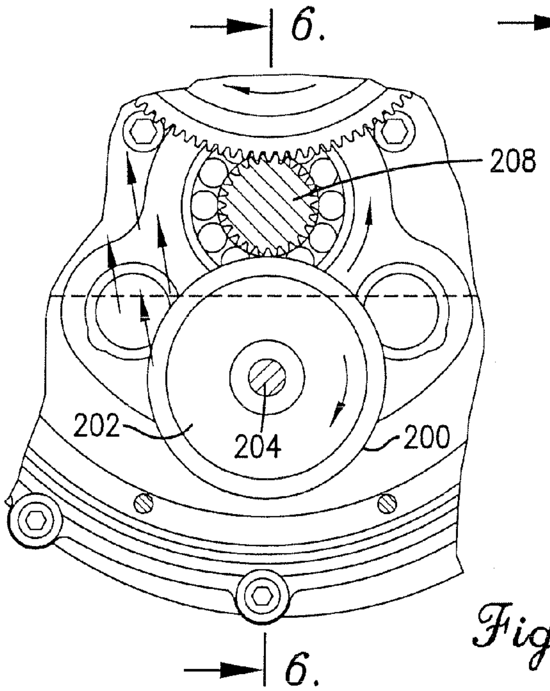
FIG. 5 is a greatly enlarged, fragmentary cross-sectional view of a second embodiment of the present invention, wherein the rotatable fluid-propelling element comprises a wheel having an outer tire that engages the pinion gear of the impeller shaft.
Figure 6:
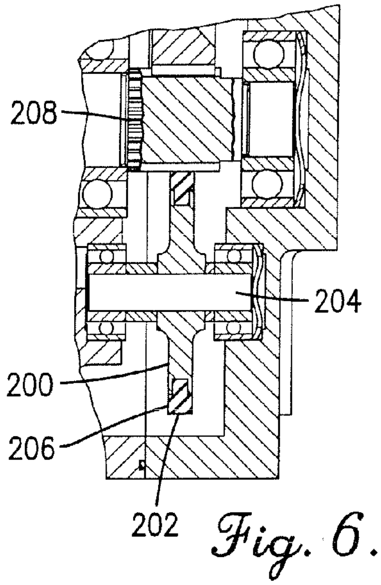
FIG. 6 is a fragmentary cross-sectional view taken generally along line 6-6 of FIG. 5.

One possible alternative of the lubricant slinging device is shown in FIGS. 5 and 6. Particularly, the device comprises a wheel 200 including a hub 202 fixed to the shaft 204 and a tire 206 mounted to the hub 202. The tire 206 is formed of any suitable material (e.g., ultra-high molecular weight polyethylene, rubber, etc). Moreover, the tire 206 contacts the periphery of the pinion 208, such that rotation of the pinion 208 causes the wheel 200 to be rotated.

Figure 7:
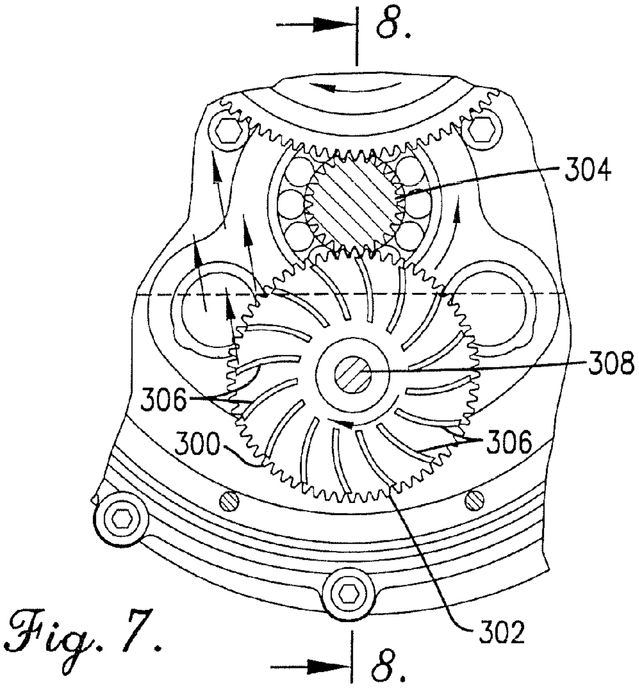
FIG. 7 is a greatly enlarged, fragmentary cross-sectional view of a third embodiment of the present invention, wherein the rotatable fluid-propelling element comprises a disc intermeshing with the pinion gear of the impeller shaft and having a plurality of vanes projecting from one side thereof.
Figure 8:
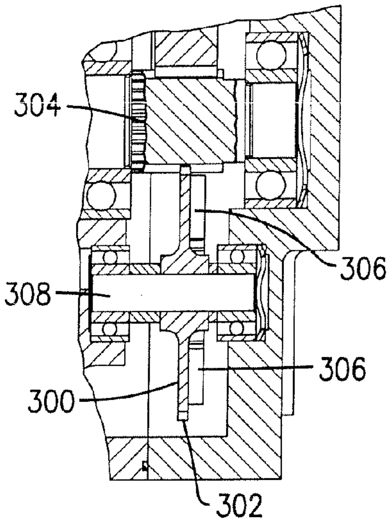
FIG. 8 is a fragmentary cross-sectional view taken generally along line 8-8 of FIG. 7.

In FIGS. 7 and 8, a third embodiment of the present invention is shown, wherein a disc 300 is provided with a toothed outer periphery 302 that intermeshes with the pinion 304. Projecting from one side of the disc 300 are a plurality of angularly spaced vanes 306, although both sides of the disc 300 may alternatively be vaned. As perhaps best shown in FIG. 7, each of the vanes 306 curves radially outward relative to the shaft 308 in a direction opposite to the direction of rotation. It will be appreciated that the orientation of the vanes 306 reduces the power that might otherwise be consumed to rotate the disc 300, yet the slinging action of the disc 300 is still enhanced compared to the first embodiment. The disc 300 may be machined, cast or otherwise formed of any suitable material (e.g., metal, high-strength plastic, etc.).

Figure 9:
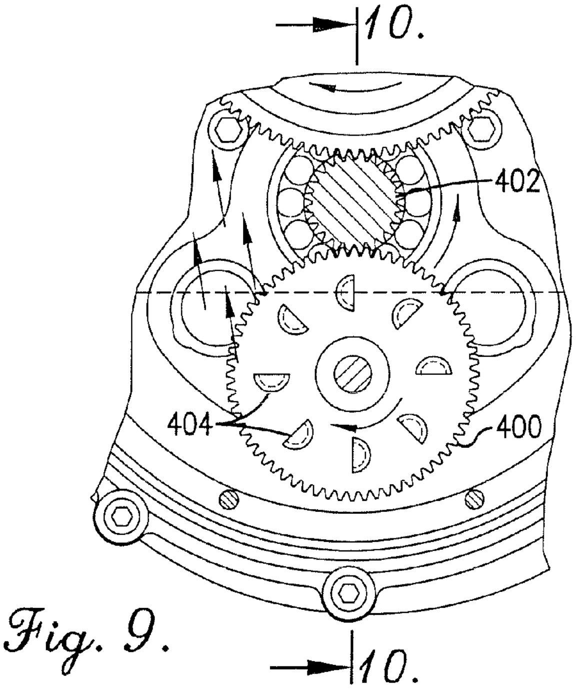
FIG. 9 is a greatly enlarged, fragmentary cross-sectional view of a fourth embodiment of the present invention, wherein the rotatable fluid-propelling element comprises a disc intermeshing with the pinion gear of the impeller shaft and having a plurality of bowl-shaped projections extending from one side thereof.
Figure 10:
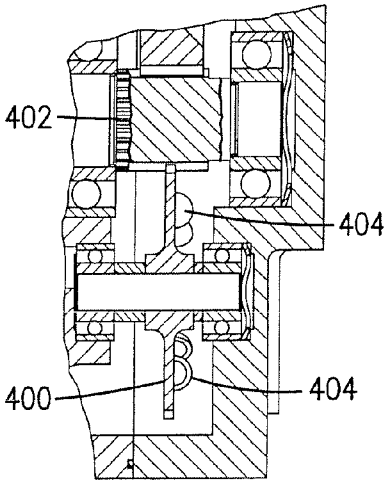
FIG. 10 is a fragmentary cross-sectional view taken generally along line 10-10 of FIG. 9.

Yet another embodiment of the present invention is shown in FIGS. 9 and 10. Similar to the embodiments shown in FIGS. 1-4 and 7-8, this embodiment involves a slinging disc 400 that intermeshes with the pinion 402. However, the disc 400 is provided with a plurality of angularly spaced bowl-shaped elements 404. If desired, both sides of the disc 400 may be provided with the elements 404. The disc 400 is formed of any suitable material. It is noted that the each of the illustrated elements 404 is generally in the shape of one quadrant of a hollow sphere, with the open cavity defined thereby facing the direction of rotation. Such an arrangement will consume more power than the other illustrated embodiments, however, the fluid displacement is believed to be significantly greater.

Figure 11:
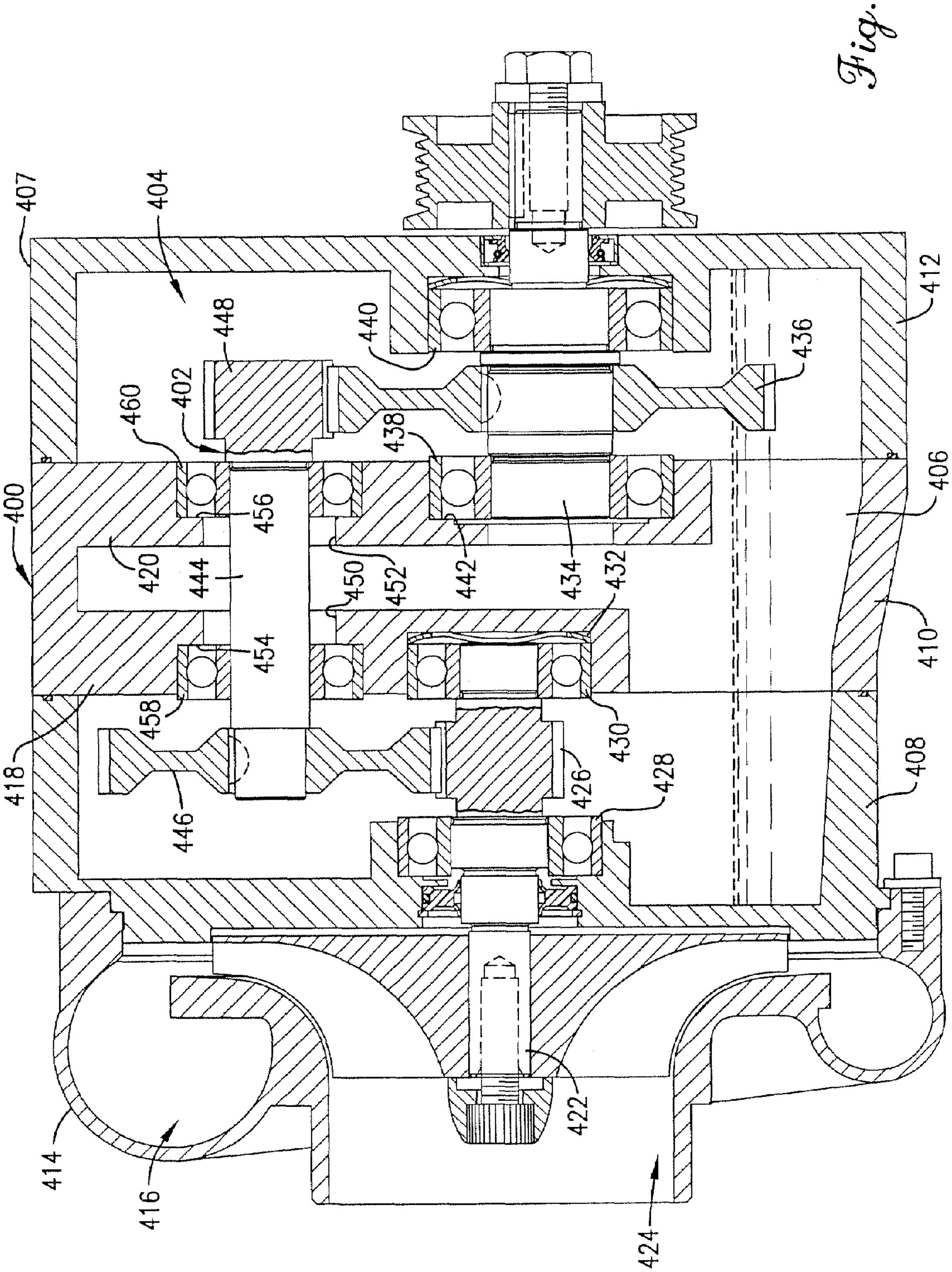
FIG. 11 is a cross-sectional view of a fifth embodiment of the present invention, wherein the lubricant slinging element is the drive gear fixed to the input shaft of the supercharger.

The final illustrated embodiment of the present invention comprises a supercharger 400 that utilizes one of the gears of the transmission 402 to lubricate the transmission components located in the transmission chamber 404 but outside the reservoir portion 406 of the chamber 404. It is initially noted that the supercharger 400 is similar to the supercharger 20 shown in FIGS. 1-4, except for several important distinctions which will subsequently be described. It shall therefore be sufficient to describe the embodiment shown in FIG. 11 primarily with respect to these distinctions.

In particular, a case 407 includes three case sections 408, 410,412 defining the transmission chamber 404 and a final case section 414 cooperating with the section 408 to define the compressor chamber 416. Similar to the previous embodiments, the transmission chamber 404 is preferably vertically oriented and teardrop shaped in cross-section so that the reservoir portion 406 is located at the bottom of the chamber 404. The intermediate transmission case section 410 includes two downwardly projecting spokes 418 and 420 that extend from the top of the section 410. The spokes 418,420 are each as thin in cross-sectional shape as possible to minimize their interference with lubricant dispersion throughout the transmission chamber 404. The case sections 408,410,412 are interconnected by suitable means (e.g., threaded fasteners).

Similar to the previous embodiments, the impeller shaft 422 is rotatably supported in a concentric relationship with the inlet 424 to the compressor chamber 416. In addition, the shaft 422 includes a pinion 426 machined thereon and is supported by a pair of bearing assemblies 428 and 430 located within the transmission chamber 404. However, in this embodiment, the bearing assembly 430 is positioned within a socket 432 defined in the lower region of the spoke 418.

The input shaft 434 is also similar to that shown in the previous embodiments. Particularly, the shaft 434 carries a drive gear 436 keyed thereto and is rotatably supported by a pair of bearing assemblies 438 and 440. However, the input shaft 434 is positioned much lower in the transmission chamber 404 (compare FIGS. 4 and 11) for purposes which will be described. Furthermore, the bearing assembly 438 is disposed within a socket 442 defined in the lower region of the spoke 420. It is also noted that the drive gear 436 and pinion 426 are not directly connected; that is, the gears 426 and 436 do not intermesh to directly transfer power from the input shaft 434 to the impeller shaft 422.

Instead, the transmission 402 includes an intermediate shaft 444 that is preferably located in the upper portion of the chamber 404 and provided with gears 446 and 448. The gear 446 is preferably keyed to the shaft 444 and, more important, intermeshes with the pinion 446 of the impeller shaft 422. The gear 448 is machined on the shaft 444 in the illustrated embodiment. Moreover, the gear 448 intermeshes with the drive gear 446. The shaft 444 and gears 446,448 consequently transmit power from the input shaft 434 to the impeller shaft 422. It is further noted that the gear ratios are such that the transmission 402 provides a significant step up in rotational speed between the input shaft 434 and impeller shaft 422. For example, the input shaft 434 ranges in rotational speeds of zero to 15,000 rpm, while the rotational speed of the illustrated impeller shaft 422 is three (3) to six (6) times that of the input shaft 434. In other words, the illustrated impeller shaft can reach speeds of about 90,000 rpm. In the preferred embodiment, the drive gear 446 has a diameter of about two (2) to three (3) inches.

Preferably, the intermediate shaft 444 projects through openings 450 and 452 defined in the spokes 418 and 420. The spoke 418 includes a socket 454 concentric with the opening 450, and the spoke 420 similarly includes a socket 456 concentric with the opening 452. Ball bearing assemblies 458 and 460 received in the sockets 454 and 456, respectively, rotatably support the intermediate shaft 444 in the desired manner.

The shafts 422,434,444, gears 426,446,448 and bearing assemblies 428,430,438,440,458,460 are all preferably located outside of the reservoir portion 406 of the transmission chamber. That is, these transmission components are preferably not submerged in the lubricant. However, the drive gear 436 does project into the reservoir portion 406 and is preferably only partly submerged within the lubricant. Rotation of the drive gear 436 consequently causes lubricant to be dispersed throughout the transmission chamber 404 and, most preferably, does so by creating a fine mist as described hereinabove.

It is noted that the illustrated arrangement does not produce or experience the untoward hydraulic separation forces which are known to adversely affect transmissions submerged wholly or partly in lubricant. This is believed to be attributable to the fact that the drive gear 446 is rotated at relatively low speeds and does not directly intermesh with the high speed components (e.g., the pinion 426) of the transmission 402. In other words, only the low speed rotatable component(s) of the transmission are submerged and such component(s) are not directly drivingly connected to the high speed component(s) of the transmission. Furthermore, the drive gear 446 is not in the same plane with the high speed components (lubrication of these components requires lateral displacement of lubricant relative to the gear 446).

All of the embodiments detailed above include self-contained superchargers wherein the lubrication system for the transmission is confined within the supercharger itself. However, there are some advantages to utilizing a lubrication system wherein the lubricant is cycled into and out of the supercharger. For example, the lubricant can be filtered and cooled externally to the supercharger prior to reentry. These advantages, however, do not outweigh the undesirable risks associated with the prior art lubrication systems that tap into the engine's lubrication system. In this regard, it is within the ambit of the present invention to utilize a lubricant reserve system to lubricate the transmission of the supercharger that cycles the lubricant into and out of an external sump wherein the lubricant reserve system is dedicated solely to the supercharger. With this configuration, it is still important to ensure the transmission does not become flooded or excessively lubricated while preventing an operational amount of lubricant from draining out of the transmission under any conditions.

One such suitable configuration for a supercharger with a dedicated lubricant reserve system in accordance with the principles of the present invention is the supercharger 500 illustrated in FIGS. 12-15. The supercharger 500 is similar to the previously described supercharger 20 shown in FIGS. 1-4 and utilizes a rotating circular fluid-slinging disc 502 partly submerged within lubrication fluid to lubricate the components of the transmission 504 located in the transmission chamber 506 but outside the reservoir portion 508 of the chamber 506. However, unlike the supercharger 20, the supercharger 500 includes a dedicated lubricant reserve system 510 that filters and cools the lubrication fluid, and maintains the reservoir portion 508 of the chamber 506 filled with the optimum operating level of the fluid. The illustrated dedicated lubricant reserve system 510 broadly includes a sump 512 for storing a reserve amount of lubrication fluid outside of the case of the supercharger 500, a pump 514 for circulating the fluid through the system 510, supply and return lines 516 and 518, respectively, fluidly communicating the sump and pump 512, 514, a filter 520 for filtering the fluid supplied through the supply line 516, and a heat exchanger 522 for cooling the fluid in the system 510.

The sump 512 is located external to the case of the supercharger 500 and is configured to store a reserve amount of lubrication fluid, in addition to the operating level of fluid contained within the case. In more detail, the illustrated sump 512 is an enclosed container that is spaced vertically beneath the case of the supercharger 500 and positioned at the lowermost point of the system 510 so that the natural draw of gravity facilitates to maintain the operating level of fluid within the case. However, as will be further detailed below, the system 510 is configured so that the operating level of fluid is constantly maintained in the case under all conditions, including failure conditions wherein the pump 514 ceases to operate. That is to say, if the pump 514 quits pumping, the operating level of fluid does not drain out of the case and into the sump 512. The sump 512 includes a fill cap 524 positioned along the top of the container and removable therefrom to allow fluid to be introduced and/or replenished into the sump 512. The illustrated sump 512 further includes a window 526 that allows the user to view the fluid level. In addition, the sump 512 may be provided with a normally closed fluid drain (not shown) to facilitate changing of the lubrication fluid or adjustment of the fluid level.

Figure 13:
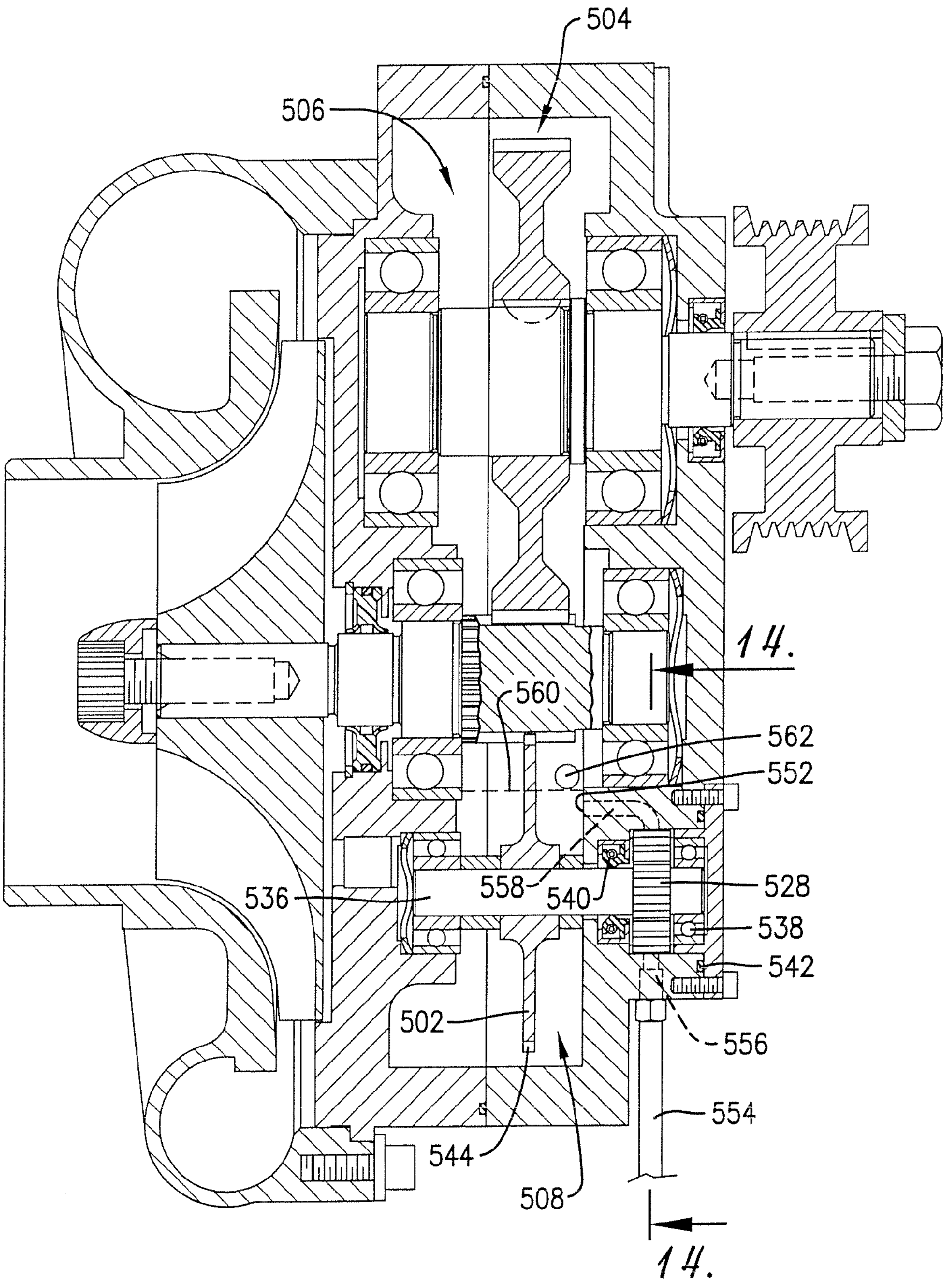
FIG. 13 is an enlarged cross-sectional view of the supercharger taken generally along line 13-13 of FIG. 12, particularly illustrating the transmission chamber and the components located therein.
Figure 14:
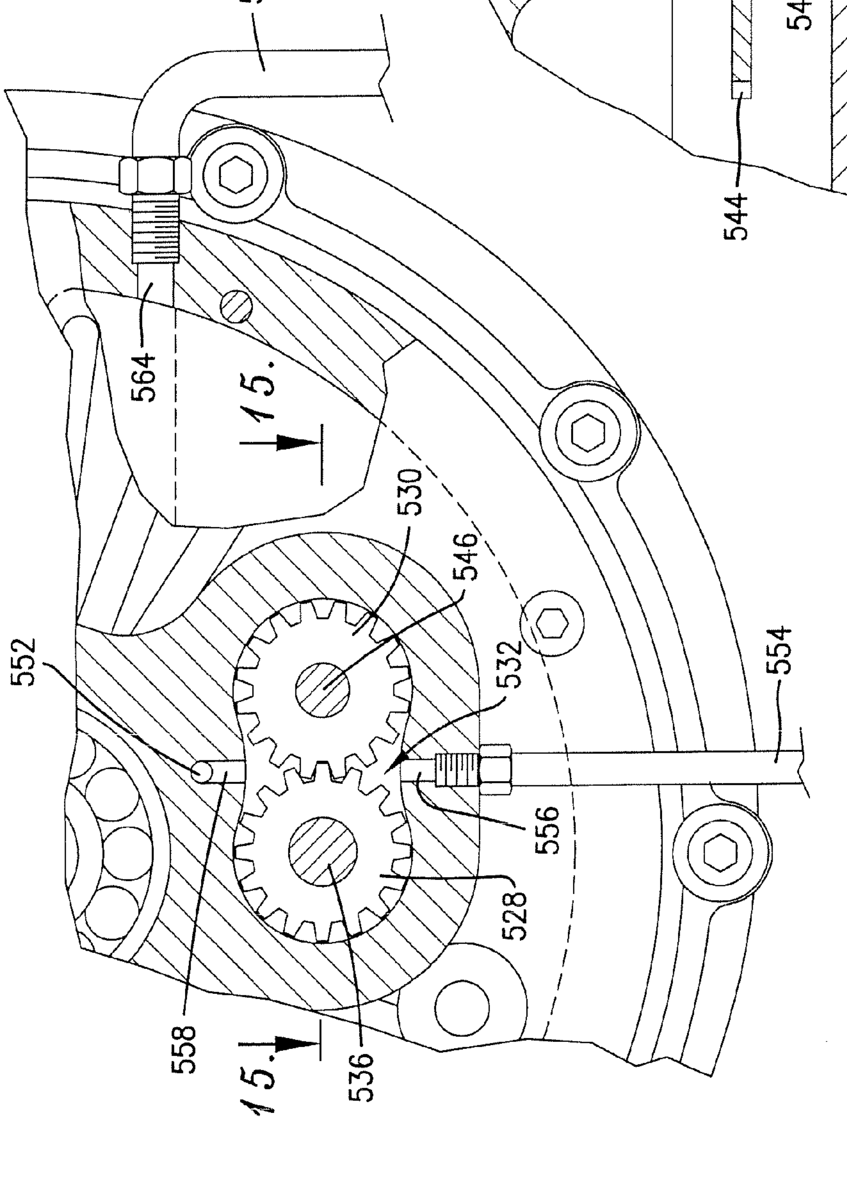
FIG. 14 is an even further enlarged cross-sectional view of the supercharger taken generally along line 14-14 of FIG. 13, particularly illustrating the pump and inlet and outlet ports in the transmission chamber for the dedicated lubricant reserve system.

The pump 514 is in fluid communication with the sump 512 and is configured to circulate the lubrication fluid through the system 510. The illustrated pump 514 is driven by the transmission 504 and is located in the case of the supercharger 500 positioned adjacent the reservoir portion 508 of the transmission chamber 506. However, as further detailed below, the pump 514 may be powered in various ways and could be alternatively positioned, including within, or external to the case. In more detail, the illustrated pump 514 is a submerged (i.e., self-priming), vane pump and includes a pair of rotatable intermeshing gears 528 and 530 housed in a pump housing 532 adjacent the reservoir portion 508 of the transmission chamber 506. As shown in FIG. 13, the illustrated pump housing 532 is formed in the outer section of the case of the supercharger 500 and for assembly purposes, is closed by a removable pump cover plate 534. For purposes that will subsequently be described, one end of the shaft 536 that rotatably supports the fluid-slinging disc 502 extends into the pump housing 532 and is rotatably supported therein by the press fit bearing assembly 538. As further detailed below, the gear 528 is fixedly interconnected to the shaft 536 so as to rotate therewith inside the pump housing 532. Other than the inlet port for the supply line as described below, the pump housing 532 is otherwise sealed off from the transmission chamber 506. In this regard, the shaft opening into the pump housing 532 is sealed with a seal assembly 540 similar in configuration to the input shaft seal assembly 154 described in detail above. The cover plate 534 is sealed against the pump housing 532 with an O-ring 542.

Figure 15:
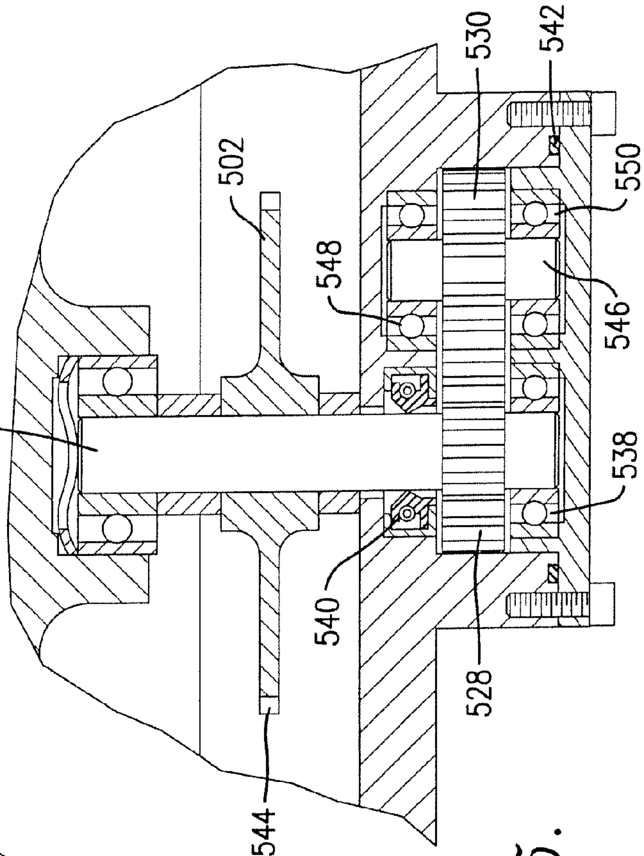
FIG. 15 is a greatly enlarged, fragmentary cross-sectional view of the supercharger taken generally along line 15-15 of FIG. 14, particularly illustrating the drive between the lubrication slinging element and the pump for the lubricant reserve system.

As previously indicated, the illustrated pump 514 is driven by the transmission 504. Particularly, and as shown in FIGS. 13 and 15, the gear 528 is fixed to, and preferably keyed to, the slinger shaft 536, although these components may be fixedly interconnected in any other suitable manner. As shown in FIG. 13, the illustrated disc 502, similar to the previously described disc 170, includes a toothed outer edge 544 that is specifically configured to intermesh with the pinion of the impeller shaft, whereby rotation of the pinion effects rotation of the disc 502 and thus rotation of the shaft 536—and the gear 528. As the gear 528 is rotated, it causes the intermeshing gear 530 to counter rotate, providing the desired pumping action therebetween. As shown in FIG. 15, the gear 530 is suitably fixed (i.e., press fit) to a shaft 546 that is rotatably supported on a pair of bearing assemblies 548 and 550. The bearing assemblies 548,550 are press fit in respective sockets within the pump housing 532. The pump 514 could be variously alternatively configured and need not be driven by the transmission 504 nor positioned within the case of the supercharger 500. For example, an external electric pump could be utilized. However, it is important that the pump enables the operating level of lubrication fluid to be provided at all times to the transmission chamber 506. As detailed below, it is within the ambit of the present invention to utilize a single pump to both circulate lubrication fluid through the lubricant reserve system 510 and to transfer fluid from the reservoir portion 508 to the transmission components located in the transmission chamber 506 but outside of the reservoir portion 508.

Figure 12:
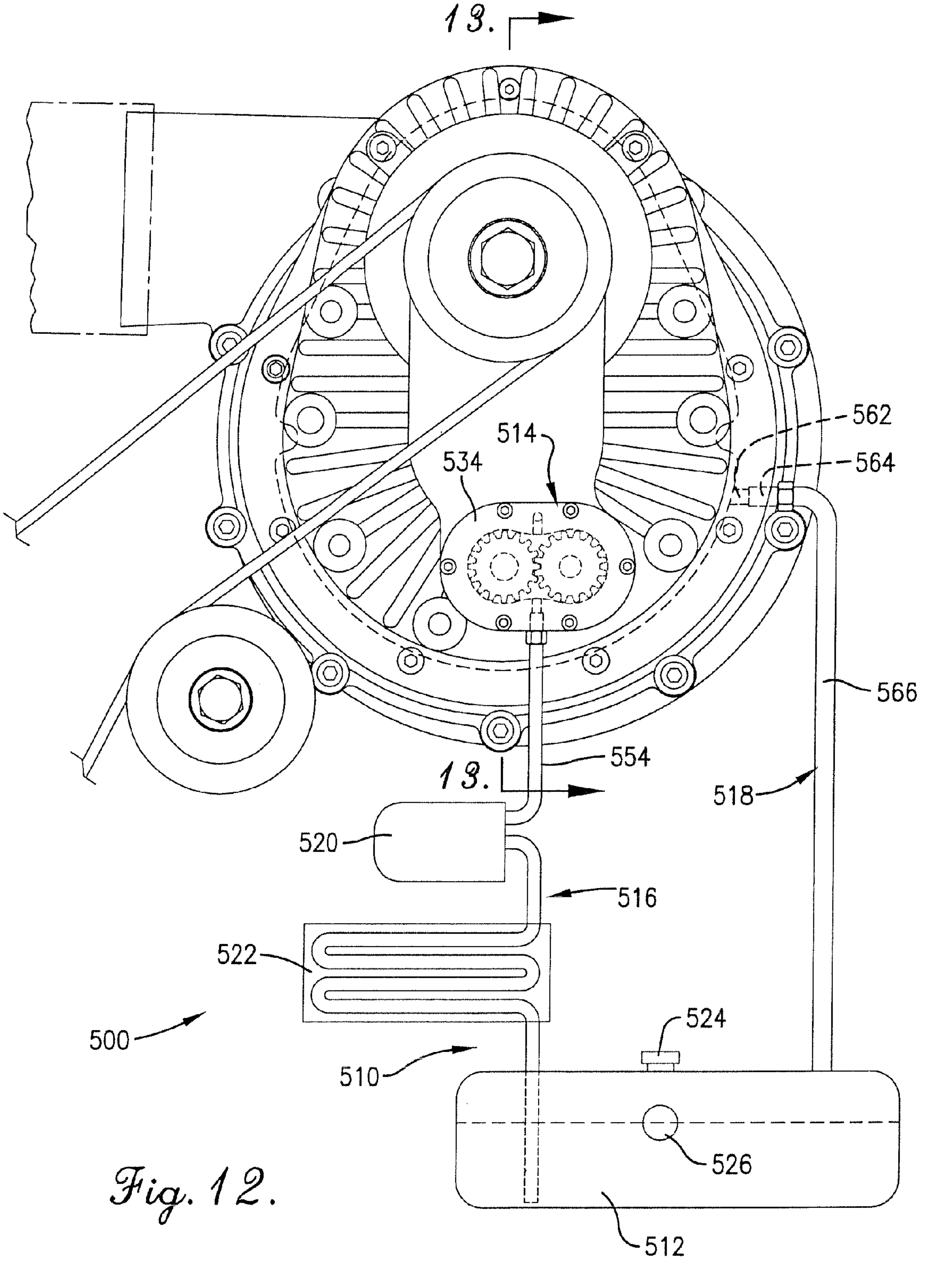
FIG. 12 is a fragmentary, partially schematic front elevational view of an internal combustion engine including a centrifugal supercharger constructed in accordance with the principles of a sixth preferred alternative embodiment of the present invention showing a dedicated lubricant reserve system for the supercharger.

The pump 514, as well as the filter 520 and the heat exchanger 522 are located along the supply line 516. The illustrated supply line 516 fluidly communicates the sump 512 with the reservoir portion 508 of the transmission chamber 506 so that lubrication fluid may be drawn out of the sump 512 and into the reservoir portion 508. In more detail, the distal end of the supply line 516 is positioned in the sump 512, preferably adjacent the lower-most surface thereof (see FIG. 12). The supply line 516 extends out of the sump 512 and through the pump housing 532 where it terminates into an inlet port 552 communicating with the reservoir portion 508 of the transmission chamber 506. The illustrated supply line 516 includes a pipe section 554 extending from the distal end to the pump housing 532. The pipe section 554 is in fluid communication with a lower pump housing section 556 of the supply line 516. The lower pump housing section 556 is integrally formed in the outer section of the case of the supercharger 500 and fluidly communicates the pipe section 554 with the internal chamber of the pump housing 532. The supply line 516 further includes an upper pump housing section 558, integrally formed in the case, that fluidly communicates the pump housing 532 with the inlet port 552 (see FIG. 13). The upper and lower pump housing sections 556,558 are spaced from one another and are preferably coaxially aligned and positioned to generally align with the intermeshing portion of the gears 528,530 as shown in FIG. 12. In this regard, the pump housing 532 itself forms a portion of the supply line 516. In this manner, when the pump 514 is activated, lubrication fluid in the sump 512 is drawn through the pipe and lower pump housing sections 554,556, forced through the gears 528,530, and propelled through the upper pump housing section 558 through the inlet port 552 and into the reservoir portion 508.

The filter 520 and the heat exchanger 522 are disposed along the pipe section 554 of the supply line 516. In one manner well known in the art, the lubrication fluid passing through the line 516 is drawn through the filter 520, which includes a filter element (not shown) configured to remove undesired debris, such as metal chips and the like, from the fluid and store the debris within the filter 20 (e.g., a screen, meshwork, etc.). The heat exchanger 522 is a simple radiator wherein the fluid passing through the line 516 passes through the exchanger 522 where it is cooled in any suitable manner (e.g., forcing air over the lines, etc.). Although the filter 520 and the heat exchanger 522 are preferred, these components could be variously configured and combined into a single component or one or more of these components could be eliminated altogether. Additionally, these components need not necessarily be positioned along the supply line 516.

As previously indicated, the dedicated lubricant reserve system 510 is configured to provide and maintain an optimal operating level of lubrication fluid in the reservoir portion 508 of the transmission 506. In this regard, at the optimum operating level, the fluid-slinging disc 502 is partly submerged within the lubrication fluid, such that rotation of the disc 502 causes lubrication fluid to be dispersed throughout the upper portion of the transmission chamber 506 (i.e., the portion of the chamber 506 above the fluid surface). Moreover, as discussed above with respect to the disc 170, at relatively higher speeds, the disc 502 eventually creates a fluid mist that migrates throughout the entire upper portion of the transmission chamber 506 and lubricates all of the transmission components therein (e.g., corresponding with a cavitation state of the rotating disc 502). At the optimum operating level, rotation of the slinging disc 502, particularly when the disc is creating the mist environment, requires negligible power and the heat generated by disc 502 is also insignificant. Also, at the optimum operating level, the mist environment created by the disc 502 provides "low pressure" lubrication to the transmission 504, which is believed to be highly desirable for the bearing assemblies and, to a lesser extent, the gears. This helps in reducing the risk of flooding the lubricated components of the transmission 504 with lubricant and thereby subjecting these components to excessive hydraulic separation forces. Finally, the operating load of the disc 502, and therefore the shaft 536 and bearing assembly 538, is relatively low and these components need not have expensive, high strength constructions. In this regard, the optimum operating level of lubrication fluid is believed to correspond with lubrication fluid completely filling the reservoir portion 508, i.e., lubrication fluid up to a fill line 560 (indicated by the dashed line in FIG. 13) representing the top boundary of the reservoir portion 508 of the transmission chamber 506, as well as the surface of the fluid contained within the transmission chamber 506.

In the illustrated system 510, the return line 518 is configured to cooperate with the other components of the system 510, as well as the transmission chamber 506, to maintain the fluid in the reservoir portion 508 at the optimum operating level. In more detail, and as shown in FIG. 13, an outlet port 562 is defined in the transmission chamber 506 just above the fill line 560 and communicates with the return line 518. Particularly, the outlet port 562 communicates with a case section 564 of the return line 518 that is integrally formed through the outer portion of the case of the supercharger 500. The section 564 in turn communicates with a pipe section 566 of the return line 518 that extends into the sump 512. The case section 564 is preferably generally linear. The pipe section 566 preferably contains a single bend between the linear section 564 and the sump 512. In this regard, the pumping action of the pump 514 and the enclosed, circulatory nature of the system 510, cooperate with the natural forces of gravity to draw any lubrication fluid immediately adjacent the outlet port 562 through the return line 518 and into the sump 512. As previously indicated, the outlet port 562 is preferably positioned immediately above the fill line 560 in the transmission chamber 506. In this manner, the fluid level in the reservoir portion 508 is constantly maintained at the fill line 560 as any excess fluid is immediately drawn through the outlet port 562 and through the return line 518. The return line 518 could be alternatively configured and could, for example, include a return pump that forces fluid through the return line. However, it is important to some aspects of the invention that the fluid level in the reservoir portion be maintained at the optimum operating level.

It is within the ambit of the present invention to utilize various alternative configurations for the lubricant reserve system 510. For example, maintaining the desired fluid level in the transmission chamber could be facilitated with the use of one or more bypass valves or similar components such as flow diverters or the like. The preferred supercharger 500 described above utilizes an internal fluid-slinging pump 502 to propel fluid from the reservoir portion 508 to the transmission components outside of the portion 508 and a separate external pump 514 for the lubricant reserve system 510 to circulate fluid through the reservoir portion 508, wherein both pumps 502,514 are driven by the supercharger's transmission 504. However, it is within the ambit of the present invention to utilize various configurations for ensuring proper lubrication of the supercharger's transmission. For example, a slinger pump within the case and powered by the transmission could be utilized in combination with an external pump that is not powered by the transmission. Additionally, the slinger pump could be entirely eliminated and a single, external pump could be utilized. However, it is important that either at least one internal pump or the like be utilized to lubricate the transmission components, or the system be configured to maintain a desired minimum level of lubricant in the transmission chamber under all conditions (e.g., even when an external pump is shut off or fails to operate, etc.).

One suitable preferred alternative configuration is the supercharger 600 illustrated in FIGS. 16 and 17. Similar to the supercharger 500 described above, the supercharger 600 includes a geared transmission 602 and utilizes a dedicated lubricant reserve system 604 to circulate lubrication fluid into the transmission chamber 606 and maintain the fluid at the optimum operating level within the reservoir portion 608. However, unlike the supercharger 500, the supercharger 600 utilizes a single internal pump 610, driven by the transmission 602, to both circulate the fluid through the system 604 and to propel the fluid in the reservoir portion 608 to the transmission components located within the chamber 606 but outside of the portion 608. Accordingly, the supercharger 600 will be described primarily with respect to these distinctions directed to the lubrication system, including the reserve system 604.

The illustrated pump 610 broadly includes fluid-slinging disc 612 and a segmented pump housing 614 encircling a limited segment of the disc 612. In more detail, and as shown in FIG. 16, the disc 612, similar to the previously described discs 170 (FIG. 3) and 502 (FIG. 13), is rotatably supported on a shaft 616 and includes a toothed outer edge 618 that is specifically configured to intermesh with the pinion of the impeller shaft, whereby rotation of the pinion effects rotation of the disc 612. The disc 612 is partly submerged in the lubricant fluid in the reservoir portion 608 so that when the disc 612 is caused to rotate, it propels fluid out of the reservoir portion 608 and onto the transmission components located in the chamber 606 but outside of the portion 608. However, unlike the previously described discs, and for purposes that will subsequently be described, the disc 612 preferably includes less teeth around the edge 618 or the teeth are further spaced. In other words, the disc 612 is in essence the previously described discs with some teeth removed (e.g., every other tooth, every third tooth, etc.).

In addition to transferring the lubrication fluid from the reservoir portion 608 to the transmission components located in the chamber 606 but outside of the portion 608 as described above, the disc 612 also cooperates with the segmented pump housing 614 to pump, or circulate, the lubrication fluid through the dedicated lubricant reserve system 604 (e.g., out of the sump and through the supply line—including through the heat exchanger and filter—and to a lesser extent out of the return line and into the sump) and into the reservoir portion 608. In more detail, and as shown in FIGS. 16 and 17, the illustrated segmented pump housing 614 projects from the floor of the transmission chamber 606 and presents an arcuate track 620 and a pair of sidewalls 622 and 624 spaced on either side of the track 620. The track 620 and sidewalls 622,624 cooperate to define a pump chamber 626 therebetween (see FIG. 16). The pump chamber 626 is configured to enclose a segment of the rotating disc 612 without engaging the disc 612. The clearance between the enclosed portion of the rotating disc 612 and the pump chamber 626 is preferably as tight as tolerable within machining limitations without hindering the rotation of the disc 612. In this regard, the segmented pump housing 614 is configured so that the tolerances between the pump housing 614 and the disc 612 and the area of the enclosed segment of the disc 612 cooperate to provide sufficient containment of the rotating disc 612 to generate a negative, pumping pressure in the pump chamber 626.

As indicated above, when the disc 612 is rotated, the pump 610 draws the lubrication fluid through the dedicated lubricant reserve system 604. In this regard, the supercharger 600 includes an inlet port 628 and an outlet port 630. In more detail, the inlet port 628 is formed in the arcuate track 620 of the segmented pump housing 614 and fluidly communicates the transmission chamber 606 with the supply line of the reserve system 604. The supply line includes a conduit section 632 integrally formed through the outer section of the case of the supercharger 600 and through the pump housing 614 (see FIG. 16). The conduit section 632 is preferably generally linear and substantially open so as to provide as minimal restrictions to the flow of fluid there through as possible. In a similar manner, the remainder of the supply line is also preferably configured to minimize any restrictions to the flow of fluid there through. The inlet port 628 is preferably positioned adjacent the lower-most point of the track 620 to facilitate fluid flow through the inlet port 628, through the pump chamber 626, and into the reservoir portion 608. The outlet port 630 is configured in a manner similar to that detailed above with respect to the outlet port 562 to facilitate maintaining an optimum operating level of fluid in the reservoir portion 608 and will therefore not be further described in detail.

In operation, as the disc 612 is rotated, a limited segment of the disc 612 passes through the pump chamber 626. As the disc 612 passes through the chamber 626, a negative, pumping pressure is generated in the pump chamber 626 causing lubrication fluid in the sump of the reserve system 604 to be drawn through the supply line and through the inlet port 628 into the pump chamber 626 and thus the reservoir portion 608 of the transmission chamber 606. Lubrication fluid in the reservoir portion 608 is propelled by the rotating disc 612 throughout the transmission chamber 606 to thereby lubricate the transmission components in the preferred low pressure misting manner previously described in detail.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A centrifugal supercharger having self-contained transmission lubrication, said centrifugal supercharger comprising:

a case presenting a compressor chamber and a transmission chamber, said transmission chamber having a fluid reservoir portion;

lubrication fluid contained entirely within the transmission chamber and filling only the fluid reservoir portion thereof;

a rotatable impeller in the compressor chamber;

a gear-type transmission operable to drivingly connect the impeller to a power source, said transmission including an impeller shaft that extends from the transmission chamber into the compression chamber to support the impeller, said transmission including an input shaft that projects from the transmission chamber outside the case for connection to the power source, said transmission including a drive gear and a driven impeller gear mounted within the transmission chamber respectively on the input and impeller shafts, said gears being drivingly connected to spin the impeller shall at a faster rotational speed than the input shaft, said transmission being located at least partly in the transmission chamber but at least substantially outside the fluid reservoir portion thereof; and a lubrication slinger disc rotatably mounted in the transmission chamber and extending into the fluid reservoir portion, said transmission causing rotation of the lubrication slinger disc when driven by the power source, with the lubrication slinger disc being operable when rotated to propel lubrication fluid from the fluid reservoir portion to the transmission located within the transmission chamber, said transmission further including an intermediate shaft drivingly connected between the impeller and input shafts.

2. A centrifugal supercharger having self-contained transmission lubrication, said centrifugal supercharger comprising:

a case presenting a compressor chamber and a transmission chamber, said transmission chamber having a fluid reservoir portion;

lubrication fluid contained entirely within the transmission chamber and filling only the fluid reservoir portion thereof;

a rotatable impeller in the compressor chamber;

a gear-type transmission operable to drivingly connect the impeller to a power source, said transmission including an impeller shaft that extends from the transmission chamber into the compression chamber to support the impeller, said transmission including an input shaft that projects from the transmission chamber outside the case for connection to the power source, said transmission including a drive gear and a driven impeller gear mounted within the transmission chamber respectively on the input and impeller shafts, said gears being drivingly connected to spin the impeller shaft at a faster rotational speed than the input shaft, said transmission being located at least partly in the transmission chamber but at least substantially outside the fluid reservoir portion thereof; and a lubrication slinger disc rotatably mounted in the transmission chamber and extending into the fluid reservoir portion, said transmission causing rotation of the lubrication slinger disc when driven by the power source, with the lubrication slinger disc being operable when rotated to propel lubrication fluid from the fluid reservoir portion to the transmission located within the transmission chamber, said lubrication slinger disc comprising a wheel that includes a hub and an outer tire fixed to the hub, said tire engaging the impeller gear so that rotation of the impeller gear effects rotation of the outer wheel.

3. A centrifugal supercharger having self-contained transmission lubrication, said centrifugal supercharger comprising:

a case presenting a compressor chamber and a transmission chamber, said transmission chamber having a fluid reservoir portion;

lubrication fluid contained entirely within the transmission chamber and filling only the fluid reservoir portion thereof;

a rotatable impeller in the compressor chamber;

a gear-type transmission operable to drivingly connect the impeller to a power source, said transmission including an impeller shall that extends from the transmission chamber into the compression chamber to support the impeller, said transmission including an input shaft that projects from the transmission chamber outside the case for connection to the power source, said transmission including a drive gear and a driven impeller gear mounted within the transmission chamber respectively on the input and impeller shafts, said gears being drivingly connected to spin the impeller shaft at a faster rotational speed than the input shaft, said transmission being located at least partly in the transmission chamber but at least substantially outside the fluid reservoir portion thereof; and a lubrication slinger disc rotatably mounted in the transmission chamber and extending into the fluid reservoir portion, said transmission causing rotation of the lubrication slinger disc when driven by the power source, with the lubrication slinger disc being operable when rotated to propel lubrication fluid from the fluid reservoir portion to the transmission located within the transmission chamber said lubrication slinger disc being outside the driving connection between the impeller and power source so that at least substantially no driving power is transferred to the impeller by the lubrication slinger disc, said lubrication slinger disc being rotatably supported by a pair of bearing assemblies; and a slinger disc shall rotatably supported by the pair of bearing assemblies, with the lubrication slinger disc being mounted on the slinger disc shall, said slinger disc shaft located within the transmission chamber and spaced apart from the input and impeller shafts, said lubrication slinger disc being rotatably driven by the transmission.

4. The centrifugal supercharger as claimed in claim 3, said lubrication slinger disc drivingly contacting the impeller shall so that rotation of the impeller shall is imparted to the lubrication slinger disc, said case presenting multiple pairs of opposed aligned mounting sockets, with said pair of bearing assemblies being selectively received in one of the pairs of mounting sockets, each of said pairs of mounting sockets being centered at respective locations along an arc spaced below the impeller rotation axis, said arc having a constant arc radius measured from the impeller rotation ax is so that the lubrication slinger disc remains in driving contact with the impeller shaft when said slinger disc shaft is rotatably supported by the hearing assemblies in any one of the pairs of mounting sockets.

5. The centrifugal supercharger as claimed in claim 3, said lubrication slinger disc including circumferential teeth that intermesh with the impeller gear to drivingly interconnect the lubrication slinger disc and the impeller shaft.

6. The centrifugal supercharger as claimed in claim 3, said transmission defining a ratio of input-to-impeller shall speed in the range of 1:3 to 1:6.

7. The centrifugal supercharger as claimed in claim 3, said gears drivingly intermeshing with one another and presenting corresponding diameters, said lubrication slinger disc presenting a disc rotation axis spaced apart from an axis of the drive gear and presenting a disc diameter, said disc diameter being no larger than the drive gear diameter to thereby compactly position the lubrication slinger disc relative to the transmission, said disc diameter being larger than the impeller gear diameter to extend below the gears into the fluid reservoir portion for propelling lubrication fluid.

8. The centrifugal supercharger as claimed in claim 3, said impeller shaft causing rotation of the lubrication slinger disc when driven by the power source, with the lubrication slinger disc being rotatable at a speed no greater than the impeller.

9. The centrifugal supercharger as claimed in claim 3, said fluid reservoir portion of the transmission chamber being positioned below the transmission located within the transmission chamber, such that rotation of the lubrication slinger disc causes lubrication fluid in the fluid reservoir portion to be slung upwardly to the transmission.

10. The centrifugal supercharger as claimed in claim 3, said lubrication slinger disc being the sole pump that lubricates the transmission.

11. The centrifugal supercharger as claimed in claim 3, said lubrication slinger disc presenting an outer circumferential surface, said lubrication slinger disc having an outer surface speed of at least about 3,500 feet per minute during rotation of the impeller.

12. The centrifugal supercharger as claimed in claim 3, said lubrication slinger disc presenting an outer, generally circular surface that engages the impeller gear so that rotation of the impeller gear effects rotation of the lubrication slinger disc.

13. The centrifugal supercharger as claimed in claim 3, said impeller shaft presenting a cantilevered section that extends from the transmission chamber into the compression chamber, said impeller being mounted on the cantilevered section.

14. A centrifugal supercharger having self-contained transmission lubrication, said centrifugal supercharger comprising:

a case presenting a compressor chamber and a transmission chamber, said transmission chamber having a fluid reservoir portion;

lubrication fluid contained entirely within the transmission chamber and filling only the fluid reservoir portion thereof;

a rotatable impeller in the compressor chamber;

a gear-type transmission operable to drivingly connect the impeller to a power source, said transmission including an impeller shall that extends from the transmission chamber into the compression chamber to support the impeller, said transmission including an input shaft that projects from the transmission chamber outside the case for connection to the power source, said transmission including a drive gear and a driven impeller gear mounted within the transmission chamber respectively on the input and impeller shafts, said gears being drivingly connected to spin the impeller shaft at a faster rotational speed than the input shaft, said transmission being located at least partly in the transmission chamber but at least substantially outside the fluid reservoir portion thereof; and a lubrication slinger disc rotatably mounted in the transmission chamber and extending into the fluid reservoir portion, said transmission causing rotation of the lubrication slinger disc when driven by the power source, with the lubrication slinger disc being operable when rotated to propel lubrication fluid from the fluid reservoir portion to the transmission located within the transmission chamber, said lubrication slinger disc and said impeller presenting respective rotation axes spaced apart from one another, said lubrication slinger disc being rotatably supported by a pair of bearing assemblies, said case presenting multiple pairs of opposed aligned mounting sockets, with said pair of bearing assemblies being selectively received in one of the pairs of mounting sockets, said lubrication slinger disc drivingly contacting the impeller shaft so that rotation of the impeller shaft effects rotation of the lubrication slinger disc, each of said pairs of mounting sockets being centered at respective locations along an arc spaced below the impeller rotation axis, said arc having a constant arc radius measured from the impeller rotation axis so that the lubrication slinger disc remains in driving contact with the impeller shaft when said pair of bearing assemblies is received in any one of the pairs of mounting sockets.

15. The centrifugal supercharger as claimed in claim 14, each of said shafts being rotatably supported by respective pairs of bearing assemblies that are located within the transmission chamber, which are lubricated by the lubrication slinger disc.

16. The centrifugal supercharger as claimed in claim 14, said lubrication slinger disc including circumferential teeth that intermesh with the impeller gear so that the lubrication slinger disc is in driving contact with the impeller shaft.

17. The centrifugal supercharger as claimed in claim 14, said transmission defining a ratio of input-to-impeller shaft speed in the range of 1:3 to 1:6.

18. The centrifugal supercharger as claimed in claim 14, said gears drivingly intermeshing with one another and presenting corresponding diameters, said disc rotation axis being spaced apart from an axis of the drive gear and presenting a disc diameter, said disc diameter being no larger than the drive gear diameter to thereby compactly position the lubrication slinger disc relative to the transmission, said disc diameter being larger than the impeller gear diameter to extend below the gears into the fluid reservoir portion for propelling lubrication fluid.

19. The centrifugal supercharger as claimed in claim 14, said impeller shaft causing rotation of the lubrication slinger disc when driven by the power source, with the lubrication slinger disc being rotatable at a speed no greater than the impeller.

20. The centrifugal supercharger as claimed in claim 14, said fluid reservoir portion of the transmission chamber being positioned below the transmission located within the transmission chamber, such that rotation of the lubrication slinger disc causes lubrication fluid in the fluid reservoir portion to be slung upwardly to the transmission.

21. The centrifugal supercharger as claimed in claim 20, said transmission chamber being generally teardrop-shaped in cross-section, with the fluid reservoir portion being wider in cross-section than any other portion of the transmission chamber.

* * * * *